(12) United States Patent
Rehfeld et al.

(10) Patent No.: US 7,344,772 B2
(45) Date of Patent: Mar. 18, 2008

(54) SOUND-DAMPING PROFILED MEMBER

(75) Inventors: Marc Rehfeld, Ezanville (FR); Beatrice Mottelet, Compiegne (FR); Dimitri Leroy, Liege (FR); Frederic Drujon, Machemont (FR)

(73) Assignee: Saint-Gobain Glass France, Courbevoie (FR)

( * ) Notice: Subject to any disclaimer, the term of this patent is extended or adjusted under 35 U.S.C. 154(b) by 46 days.

(21) Appl. No.: 10/521,786

(22) PCT Filed: Jul. 30, 2003

(86) PCT No.: PCT/FR03/02417

§ 371 (c)(1), (2), (4) Date: Jul. 28, 2005

(87) PCT Pub. No.: WO2004/012952

PCT Pub. Date: Feb. 12, 2004

(65) Prior Publication Data

US 2006/0165977 A1   Jul. 27, 2006

(30) Foreign Application Priority Data

Jul. 31, 2002   (FR) .................................... 02 09732

(51) Int. Cl.
*B60J 10/02* (2006.01)
*B60J 1/02* (2006.01)

(52) U.S. Cl. ................ 428/304.4; 428/317.7; 428/343; 428/354

(58) Field of Classification Search ................ 428/343, 428/354, 304.4, 317.7
See application file for complete search history.

(56) References Cited

U.S. PATENT DOCUMENTS 5,632,835 A * 5/1997 Niwa et al. .................... 156/99
2001/0051260 A1   12/2001 Johnson et al.

FOREIGN PATENT DOCUMENTS

EP   0 696 523 A1 *  2/1996
JP   63-192608        8/1988

OTHER PUBLICATIONS

Machine Translation of the Claims and Detailed Description of JP Abstract Publication 2000-272936, Oct. 3, 2000.*
Horst Czichos: "Huette: Die Grundlagen der Ingenieurwissenschaften" SPRINGER-VERLAG, vol. 29, XP002178367 pp. D-44, 1989.

* cited by examiner

*Primary Examiner*—Daniel Zirker
(74) *Attorney, Agent, or Firm*—Oblon, Spivak, McClelland, Maier & Neustadt, P.C.

(57) ABSTRACT

A strip to be inserted between two elements to cause acoustic attenuation of noise propagating through at least one of the two elements. The strip is made of at least one plastic-based damping material, the strip having an equivalent real stiffness per unit length $K'_{eq}$ equal to at least 25 MPa and an equivalent loss factor $\tan \delta_{eq}$ equal to at least 0.25.

47 Claims, 11 Drawing Sheets

FIG. 7
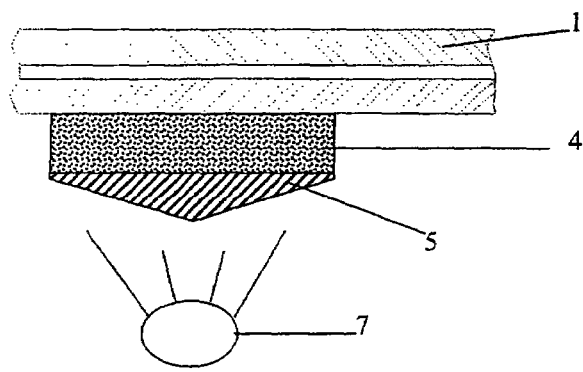
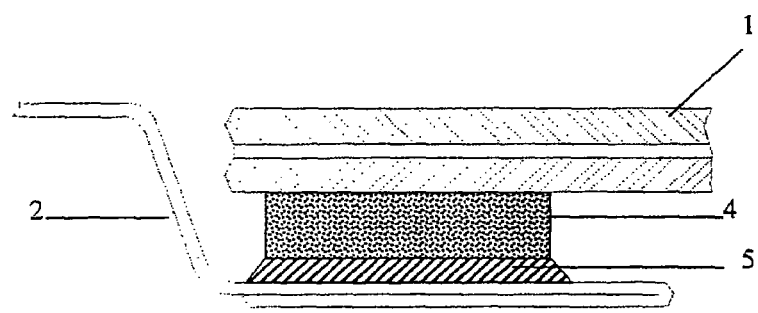
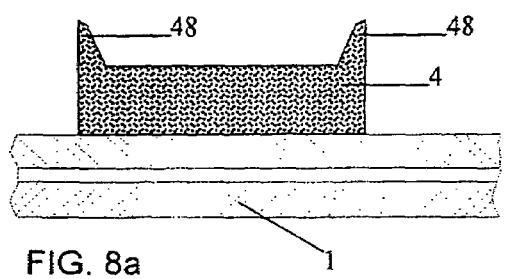
FIG. 8a
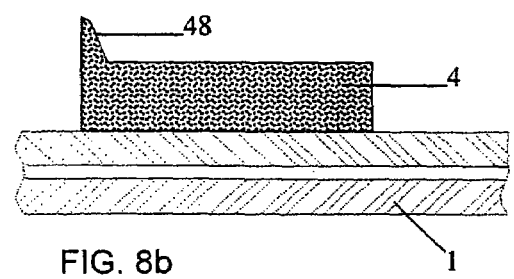
FIG. 8b
FIG. 8c
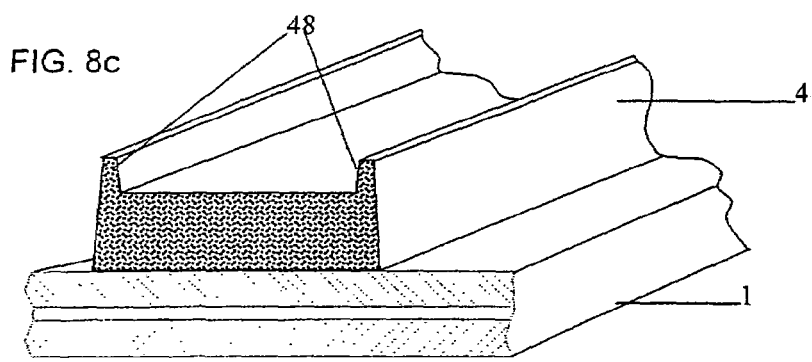

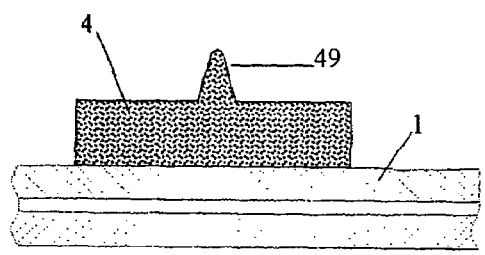
FIG. 8d
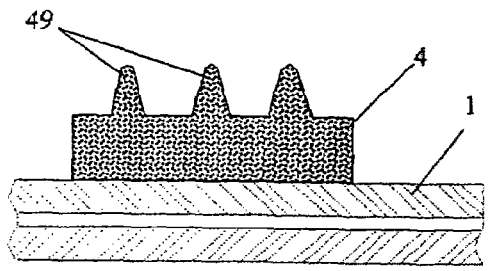
FIG. 8e
FIG. 8f
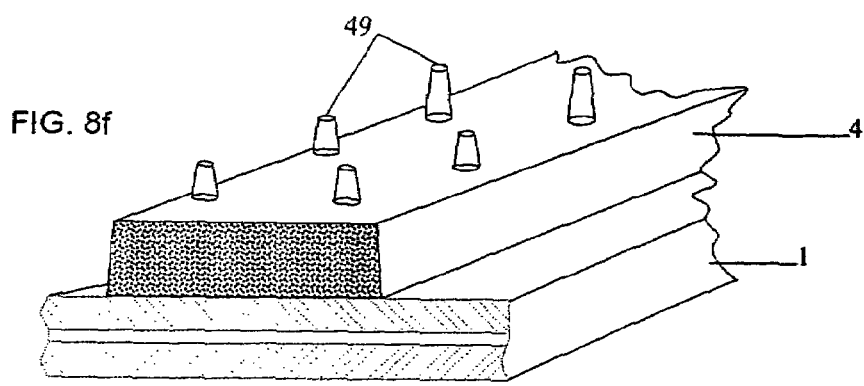
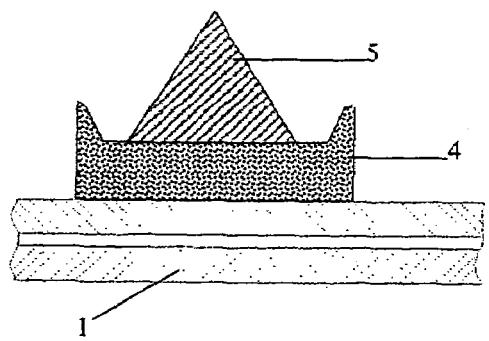
FIG. 9
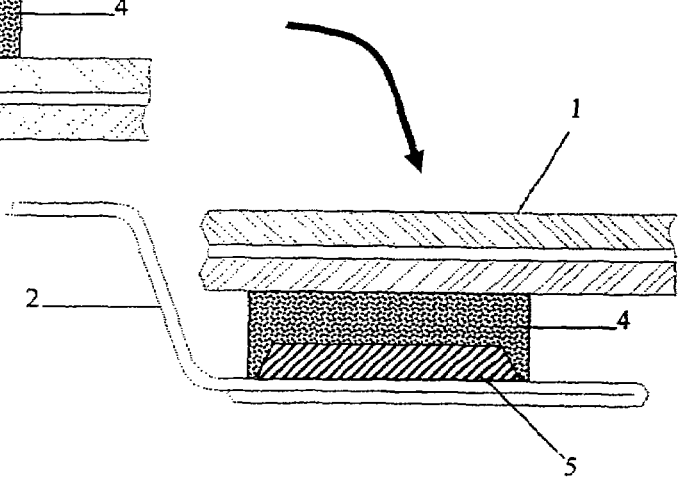

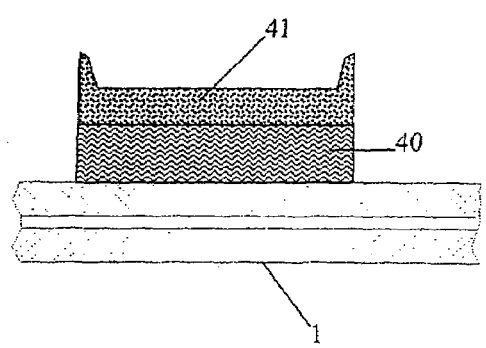
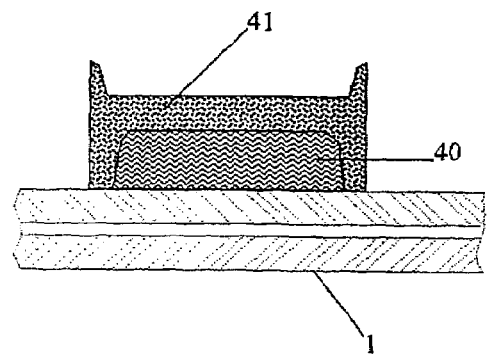
FIG. 10a          FIG. 10b
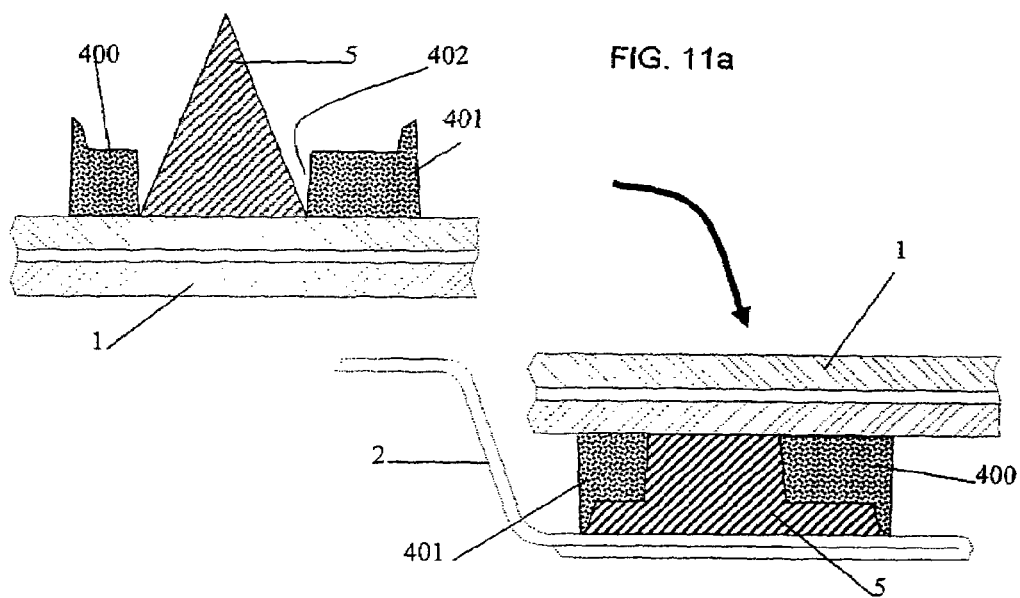
FIG. 11a

Engine speed (rpm)

SOUND-DAMPING PROFILED MEMBER

The present invention relates to a strip to be inserted between two elements in order to cause acoustic attenuation of the noise propagating through at least one of the elements, the strip being made of at least one plastic-based damping material i.

Such a strip may especially be used for glazing in vehicles, particularly automobiles, for the purpose of improving acoustic comfort.

In automobiles, the sources of discomfiture, of mechanical, thermal, visibility or other origin, have gradually been overcome. However, improvement in acoustic comfort still remains to be achieved.

Aerodynamic noise, i.e. noise created by the friction of the air over a moving vehicle, has, at least in part, been dealt with at its source, that is to say, to save energy, shapes have been modified, thus improving penetration through the air and decreasing turbulence, which is itself a source of noise. Among the walls of a vehicle that separate the external source of aerodynamic noise from the interior space where the passengers are, the windows are obviously the most difficult to deal with. It is not possible to use pasty or fibrous absorbents, that are reserved for the opaque walls, and, for practical reasons or for reasons of weight, the thicknesses cannot be increased inconsiderably. European patent EP-B1-0 387 148 discloses glazing assemblies that exhibit good insulation against aerodynamic noise without their weight and/or their thicknesses being increased too greatly. The patent thus provides a laminated glazing assembly whose interlayer has a flexural damping factor $v=\Delta f/f_c$ of greater than 0.15, the measurement being carried out by exciting, by means of a shock, a laminated bar 9 cm in length and 3 cm in width of a laminated glass in which the resin is between two thick glass panes, each 4 mm in thickness, and by measuring $f_c$, the resonant frequency of the first mode, and $\Delta f$, the width of the peak at an amplitude of $A/\sqrt{2}$ where A is the maximum amplitude at the frequency $f_c$ such that its acoustic damping index does not differ, for any frequency greater than 800 Hz, by more than 5 dB from a reference index that increases by 9 dB per octave up to 2000 Hz and by 3 dB per octave at higher frequencies. In addition, the standard deviation $\sigma$ of the differences in its acoustic damping index compared with the reference index remains less than 4 dB. The thicknesses of the two glass panes may be identical and equal to 2.2 mm. That patent thus provides a general solution to the problem of acoustic insulation with respect to the aerodynamic noise of a vehicle.

On the other hand, the treatment of glazing assemblies for protection against solid-borne noise, i.e. against noise transmitted via solids, in the frequency range from 50 to 300 Hz or even 800 Hz, is more difficult to achieve. This is because it turns out that the use of connecting pieces remains inadequate for avoiding transmission of the noise through vibration of the glazing. In this regard, it has been found that a humming noise perceptible to passengers appears at certain rotation speeds of the engine, thus creating a source of discomfiture. This is because the rotation of the engine creates vibrations that are transmitted, for example, to the bodywork and thus, via a chain effect, to the windows. It is known that the energy acquired by an object subjected to a shock causes a vibration phenomenon and that, immediately after the shock, the object, now free again, vibrates in its natural mode. A vibration frequency is associated with each mode. The amplitude of the vibration depends on the initial excitation, i.e. on the spectral component of the shock (the amplitude of the shock at the frequency studied) and on the area of impact of the shock, the modal deformation being greater or smaller depending on whether the shock occurs at a vibration antinode or at a vibration node.

In order for a natural mode to be excited:
(1) the deformation caused at the point of impact must not be at a vibration node of the mode; and,
(2) the energy spectrum of the shock must have a component at the resonant frequency of the mode.

The latter condition is virtually always fulfilled, since a very brief shock has a virtually uniform energy spectrum.

The first condition is also fulfilled and, for a bar free at its ends for example, all that is required is to tap one of the ends in order to excite all the modes.

Solid-borne excitation is peripheral and it has been demonstrated that, at certain engine vibration frequencies, that is to say at certain rotation speeds of the engine, the windows and the passenger compartment of the vehicle each have a vibration mode whose coupling amplifies the humming that arises from the radiation of noise emanating in this case from the engine, via the windows. Of course, the rotation speed of the engine that gives rise to these phenomena is peculiar to each type of vehicle and thus cannot be generalized to a single value.

Thus, to improve acoustic comfort in the passenger compartment of the vehicle with respect to solid-borne noise, patent EP 0 844 075 proposes a laminated glazing assembly comprising at least one interlayer film possessing very satisfactory damping properties as regards audible solid-borne sounds, since it has a loss factor tan δ of greater than 0.6 and a shear modulus G' of less than $2 \times 10^7$ N/m², within a temperature range between 10 and 60° C.

Another solution may consist in placing around the periphery of the glazing a strip with acoustic damping properties. For this purpose, patent DE 198 06 122 proposes a strip that firstly bonds the pane of the vehicle to the bodywork and also acts as a damper. The strip is hollow and filled with a pasty material whose function is to damp the vibrations, the body of the strip being made of an adhesive material that becomes elastic after crosslinking.

However, the latter solution has the drawback that the strip does not have a stiffness sufficient to guarantee the desired acoustic performance.

Firstly, the strip described, which is a coextruded bead, is designed to be compressed between the glazing and the bodywork, but this method of application by compression, coupled with the constituent materials of the strip, does not guarantee the desired final dimensional shape. Now, after the glazing has been attached to the bodywork by means of said strip, it is essential for the dimensions of the strip to be maintained throughout the damping performance that it must provide, as we will see in the description of the invention.

Secondly, the pasty material internal to the body of the strip remains soft and there is no guarantee that it remains confined after the coextruded bead has been compressed against the bodywork element, since the body of the strip formed from the adhesive material is also pasty before crosslinking, thereby incurring, during deposition of the bead, the risk of the internal pasty material spreading out beyond the body of the strip.

The object of the invention is therefore to provide, as acoustic damping solution, especially for the glazing of automobiles, a strip that does not have the drawbacks of the prior art.

According to the invention, the strip is characterized in that it has an equivalent real stiffness per unit length $K'_{eq}$ equal to at least 25 MPa and an equivalent loss factor tan $\delta_{eq}$ equal to at least 0.25.

The stiffness is a quantity that relates the deformations of the strip to the forces that are applied to it. The stiffness is defined by the rigidity of the constituent materials of the strip and by the geometry of the strip, the rigidity being a quantity characteristic of the material, which is a function of the Young's modulus and/or the shear modulus. In the rest of the description, the formulae given for calculations will be related only to the Young's modulus—the shear modulus will not be taken into account, the tensile/compressive stresses and strains related through the Young's modulus being sufficiently representative.

In a known manner, the equivalent stiffness per unit length $K^*_{eq}$ is a complex number written as $K^*_{eq} = K'_{eq} + j K''_{eq}$ with a real part $K'_{eq}$, called in the description the equivalent real stiffness per unit length, and an imaginary part $K''_{eq}$ that corresponds to the loss modulus, i.e. to the conversion of the deformation energy of the strip into thermal energy throughout the entire strip.

The loss modulus is defined by $$\tan\delta_{eq} = \frac{K''_{eq}}{K'_{eq}}.$$

To determine the equivalent real stiffness per unit length $K'_{eq}$ and the equivalent loss factor $\tan\delta_{eq}$ of a strip formed from one or more materials, these quantities will be measured using a viscoanalyzer—an apparatus known to those skilled in the art, including acoustics and polymer experts. The viscoanalyzer measures the equivalent real stiffness $k'_{eq}$ and the equivalent loss factor $k''_{eq}$ of a strip specimen with a cross section identical to that of the strip and with a length L and then the following are calculated:

the ratio of the measured equivalent real stiffness to the length L in order to obtain the equivalent real stiffness per unit length $K'_{eq}$ of the strip: $K'_{eq} = k'_{eq}/L$; and the ratio of the measured equivalent loss factor to the measured equivalent real stiffness in order to obtain the equivalent loss factor $\tan\delta_{eq}$ of the strip:

$$\frac{k''_{eq}}{k'_{eq}}.$$

Advantageously, the strip has an equivalent real stiffness per unit length $K'_{eq}$ of between 30 MPa and 270 MPa and an equivalent loss factor $\tan\delta_{eq}$ equal to at least 0.4.

According to a first embodiment, the strip is formed from a single damping material or from several damping materials, it being possible for the damping material or materials to exhibit adhesion properties with respect to the two elements.

According to a second embodiment, the strip is formed from at least one damping material and from a nondamping adhesive material, the adhesive material being designed to bond the two elements together.

According to one feature of this second embodiment, the adhesive material adheres via two opposed faces to the two elements respectively, the damping material being bonded to at least one of the two elements.

According to another feature, the adhesive material adheres via one of its faces to the damping material that is bonded to one of the elements and adheres via its opposite face to the other element to be joined together.

According to another feature, the strip comprises several damping materials placed as a stack of layers one on top of another, each of the materials at the ends of the stack being bonded to one of the two elements to be joined together or to the adhesive material.

As a version, the strip comprises several damping materials placed in juxtaposition one beside another, butted together or otherwise, each of the materials having two opposed surfaces bonded to the two elements to be joined together, respectively.

According to yet another version, the strip comprises several damping materials placed as a stack and in juxtaposition, at least one or two materials partly constituting this combination being bonded to the two elements to be joined together.

For all these versions, when the strip also comprises the adhesive material, the latter may be placed so as to be stacked with and/or in juxtaposition with the damping material or materials. The nondamping adhesive material is, for example, a polyurethane mastic having a Young's modulus E' of 21 MPa and a loss factor $\tan\delta$ of 0.2.

According to one feature, the damping material or materials, together or with the adhesive material, are separated by an air space.

Advantageously, the damping material or materials are chosen from the following plastics: plasticized or unplasticized polyvinyl chloride; thermoplastic elastomers; one-component or two-component polyurethanes possibly modified by an elastomer, such as polyolefins, EPDM (ethylene-propylene-diene) or rubber, especially butyl rubber or nitrile rubber or else styrene-butadiene rubber; polyalkyl acrylate or methacrylate copolymers; and epoxy resins.

According to a first version of the composition, the damping material is a one-component polyurethane that has an NCO percentage content of between 0.5 and 2% and comprises:

at least one polyesterpolyol with a functionality of two (preferably between 80 and 200 g), having an OH index iOH of between 5 and 10, a glass transition temperature $T_g$ of $-50°$ C. or below and a softening point between 50 and 80° C.;

at least one polyesterpolyol with a functionality of two (preferably between 120 g and 220 g), having an index iOH between 50 and 100 and a glass transition temperature $T_g$ of $-50°$ C. or below;

at least one isocyanate with a functionality of between 2.1 and 2.7 of the diphenylmethane diisocyanate (MDI) type and having an NCO percentage content of between 11 and 33% (preferably between 180 and 220 g);

at least one catalyst (preferably between 0.5 and 3 g);

optionally, a filler of the molecular sieve type (preferably between 20 and 60 g); and optionally, at least one filler of the chalk, kaolin, talc, alumina, carbon black or graphite type (preferably between 5 and 60 g).

With such a composition, the strip formed from the single material has, at 20° C., with a reference cross section of 15 mm in width and 3 mm in thickness, an equivalent real stiffness per unit length of 400 MPa and an equivalent loss factor of 0.3.

According to yet another version of the composition, the damping material is a polyurethane prepolymer that has an NCO percentage content of between 0.5 and 2%, the material comprising:

at least one polyetherpolyol with a functionality of two, having an index iOH of between 25 and 35, a glass transition temperature $T_g$ below −50° C. and a molecular mass between 3500 and 4500;

at least one polyetherpolyol with a functionality of between 2.3 and 4, having an index iOH between 25 and 800 and a glass transition temperature $T_g$ below −50° C.;

at least one polyesterpolyol with a functionality of two, having an index iOH between 20 and 40 and a glass transition, temperature $T_g$ between −40 and −20° C.;

at least one polyesterpolyol with a functionality of two, having an index iOH between 30 and 90, a glass transition temperature $T_g$ between 0 and 30° C. and a softening point between 50 and 70° C.;

at least one isocyanate with a functionality of between 2.1 and 2.7 of the diphenylmethane diisocyanate (MDI) type and an NCO percentage content between 11 and 33%;

at least one catalyst;

optionally, a filler of the molecular sieve type; and optionally, a filler of the chalk, kaolin, talc, alumina, carbon black or graphite type.

The strip has, at 20° C., with such a composition, with a reference cross section of 15 mm in width and 3 mm in thickness, an equivalent real stiffness per unit length of 120 MPa and an equivalent loss factor of 0.75.

According to yet another feature of the invention, the strip is applied to at least one of the elements by a process of extrusion, and/or of encapsulation, and/or of transfer from a molding, and/or of injection molding.

Finally, the strip may have a uniform or non-uniform cross section over all or part of its length.

The strip is therefore inserted between two elements that may be of the metal-metal, glass-glass, metal-plastic, glass-plastic or plastic-plastic type.

As an example, the strip-may be inserted between a glass substrate and a metal element so as to be used to attach the substrate to the metal element. In particular in its use in automobile glazing, when it is placed between the glazing and the bodywork, the strip provides the glazing with improved acoustic damping properties, and especially with respect to solid-borne noise, that is to say for low frequencies of around 50 to 300 Hz. The inventors have also been able to show that the properties could even be achieved for noise in the 300 to 1 000 Hz range, known as dirty noise, in particular for laminated glazing assemblies.

Finally, the inventors have demonstrated that this strip may also provide acoustic damping of aerodynamic noise, that is to say for frequencies above 1 000 Hz, when, however, the glazing is more particularly monolithic, that is to say formed from a single sheet of glass.

The strip of the invention may therefore be used for glazing, particularly automobile glazing. The glazing may be formed from a monolithic glass, a laminated glass or what is called an "acoustic" laminated glass, i.e. one incorporating a plastic film having acoustic properties.

Finally, the invention defines a method of evaluating the acoustic damping properties of a strip designed to be inserted between two elements formed from at least one damping material i, characterized in that it consists in evaluating the equivalent real stiffness per unit length $K'_{eq}$ of the strip and the equivalent loss factor tan $\delta_{eq}$, the strip having acoustic damping properties when the equivalent real stiffness per unit length is equal to at least 25 MPa and the equivalent loss factor is equal to at least 0.25.

The evaluation of the equivalent real stiffness per unit length $K'_{eq}$ of the strip and of the equivalent loss factor tan $\delta_{eq}$ is carried out using a viscoanalyzer, as explained above.

Other advantages and features of the invention will become apparent in the rest of the description given in conjunction with the appended drawings in which:

FIG. 7 shows schematically the steps for joining two elements together by means of the strip according to the second embodiment;

FIGS. 8a to 8f illustrate, in cross section or in side view, other versions of the strip bonded to one of the elements to be joined together;

FIG. 9 shows schematically the steps for joining two elements together by means of this strip according to the version in FIG. 8a;

FIGS. 10a and 10b illustrate two versions of the coextrusion of two damping materials bonded to one of the elements to be joined together;

FIGS. 11a and 11b show schematically the steps for joining two elements together by means of the strip according to the two versions of the type in FIG. 4d;

These figures are schematic and the relative proportions of the various quantities, especially the thicknesses and widths, between the various elements of the invention have not been drawn to scale so as to make them easier to examine.

Figure 1A:
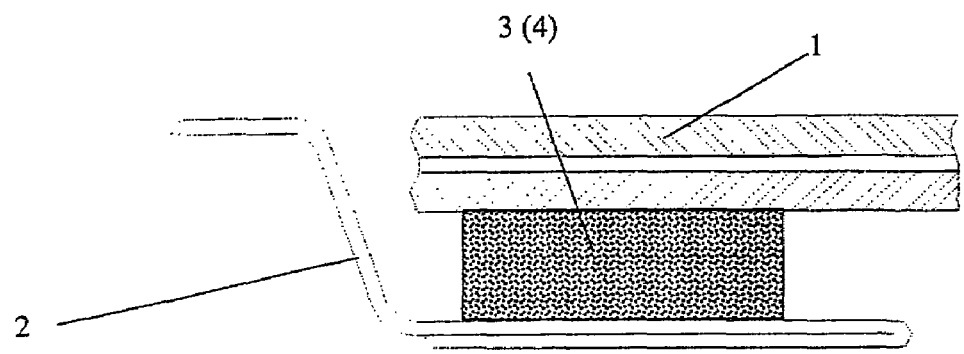
FIGS. 1a to 1c show partial sectional views of two elements joined together by means of a strip in three versions of a first embodiment of a strip of the invention.

FIG. 1a is a partial sectional view of a glazing assembly 1 joined to a carrier element 2, such as the bodywork of an automobile. The glazing assembly, formed from at least one glass substrate, is attached to the bodywork by means of a strip 3 with acoustic damping properties.

Consequently, the strip 3, joined to and inserted between two elements 1 and 2 that are, for example, the bodywork and the glazing respectively, fulfillls, apart from its vibration damping function according to the invention, the function of a device for bonding the two elements, while providing a sealing function in order to protect the passenger compartment of the vehicle from exposure to the external environment, such as exposure to dust, moisture, water. However, in another application, the strip could be inserted between the two elements only to fulfilll just its damping function, without fulfillling a function of bonding the two elements together. For example, the strip may be attached to a first element, such as a door frame of a room inside a building and may be joined to a second element, such as the door when it is closed; the strip, being stressed by the surfaces of the door and of the frame sufficiently to absorb the exciting energy of the frame, reduces the acoustic radiation inside the volume closed by said door.

The construction of the strip 3 will be described below. The strip may be embellished with functional forms that are not specifically acoustic, such as with sealing lips or with a trim.

The acoustic damping properties of the strip are defined by the equivalent stiffness per unit length and the loss factor parameters.

The strip may be formed from a single material or else from a plurality of materials, and in the latter case it is necessary to take into account the stiffness per unit length of each material. This is why the term "equivalent stiffness per unit length", denoted by $K^*_{eq}$, is used, which term therefore corresponds to the equivalent stiffness for the entire strip and the word "linear" being used to indicate that it relates to 1 m of strip.

The equivalent stiffness per unit length $K^*_{eq}$ is known to be a complex number written as $K^*_{eq} = K'_{eq} + j K''_{eq}$ with a real part $K'_{eq}$, called in the description the equivalent real stiffness per unit length, and an imaginary part $K''_{eq}$ that corresponds to the loss factor, that is to say to the conversion of the deformation energy of the strip into thermal energy throughout the entire strip.

$K^*_{eq}$ may be written according to the following formula, because the strip may comprise several materials:

$$[K^*_{eq}]^\alpha = \sum [K^*_i]^\alpha \qquad (1)$$

where:

$K^*_i$ is the complex stiffness per unit length of each constituent material i of the strip;

$\alpha = -1$ for a stack of several materials i arranged in series, that is to say in an arrangement called a stack in the rest of the description;

$\alpha = 1$ for a juxtaposition of several materials i in parallel, that is to say in an arrangement called a juxtaposition in the rest of the description.

In the case of a combination of a stack and a juxtaposition, the equivalent stiffness per unit length of the stack and of the juxtaposition will be calculated and the strip will then be normalized to just a stack or to just a juxtaposition such that $\alpha = -1$ or $\alpha = 1$, respectively.

This gives, for example for two materials in series:

$1/K^*eq = 1/K^*1 + 1/K^*2$ i.e. $1/(K'eq + jK''eq) = 1/(K'1 + jK'1) + 1/(K'2 + jK''2)$ hence:

$K'eq = [K'1^2 K'2 + K''1^2 K'2 + K'1 K'2^2 + K'1 K''2^2]/[(K'1 + K'2)^2 + (K''1 + K''2)^2]$ and $K''eq = [K'1^2 K''2 + K''1^2 K''2 + K''1 K'2^2 + K''1 K''2^2]/[(K'1 + K'2)^2 + (K''1 + K''2)^2]$.

For two materials in parallel, then:

$K'_{eq} = K'1_{eq} + K'2_{eq}$ and $K''_{eq} = K''1_{eq} + K''2_{eq}$.

Examples of stacked and/or juxtaposed arrangements of a number of materials i will be described below with reference to FIGS. 1*a* to 1*c*, 2*a* to 2*d*, 3*a* to 3*d* and 4*a* to 4*d*.

Moreover, the stiffness per unit length depends on the rigidity of the constituent material or materials of the strip, but also on the dimensional quantities of the cross section of each constituent material of the strip.

Thus, the stiffness per unit length $K^*_i$ for a given material in equation (1), being normalized to a strip length of 1 m and to a rectangular cross section of width $L_i$ and thickness $e_i$, and based on the principle that the strip is subjected to tensile/compressive stresses that are uniform over the width (the shear being ignored), may be written as:

$$K^*_i = E^*_i \times \frac{L_i}{e_i} \qquad (2)$$

where $E^*_i$ is the complex Young's modulus of the constituent material i of the strip.

By separating equation (2) into the real and imaginary parts, it may be also written as:

$$K^*_i = K'_i + jK''_i = E'_i \times \frac{L_i}{e_i} + jE''_i \times \frac{L_i}{e_i}$$

where $E'_i$ is the real part of the complex Young's modulus and called just Young's modulus in the description; and $E''_i$ is the imaginary part of the complex Young's modulus.

The reader is reminded that, in the invention, one of the parameters characterizing the acoustic properties of the strip is the equivalent real stiffness per unit length $K'_{eq}$, i.e. the real part of the complex number $K^*_{eq}$. As explained above, $K'_{eq}$ may be estimated by calculation after having measured the Young's modulus $E'_i$ of each material using a viscoanalyzer. $K'_{eq}$ may be measured using a viscoanalyzer in order to check the calculations.

These calculations are appropriate, however, when the shape of the strip is rectangular. For any other shape, this quantity will in fact be measured using the viscoanalyzer.

The selection of materials to be used so as to form the strip when these materials are not of simple rectangular shape will be made on the basis of approximation calculations, by approximating the actual cross section of each material to a rectangular cross section for which the strip is subjected to the tensile-compressive forces. If the calculations are favorable to this selection of materials, as they satisfy the claimed criteria that will be presented below, these calculations will have to be checked by measurement using the viscoanalyzer.

According to the invention, in order for the strip 3 to fulfilll its acoustic damping function, it must have an equivalent real stiffness per unit length $K'_{eq}$ equal to at least 25 MPa. Preferably, the equivalent real stiffness per unit length $K'_{eq}$ is between 30 and 250 MPa.

In addition, as was mentioned above, involved in the acoustic damping properties of the strip is the equivalent loss factor (or the tangent of the equivalent loss angle) tan $\delta_{eq}$ that is defined by the equation:

$$\tan\delta_{eq} = \frac{K''_{eq}}{K'_{eq}} \quad (3)$$

where $K'_{eq}$ is the equivalent real stiffness per unit length (the real part of $K^*_{eq}$) for the entire strip and $K''_{eq}$ is the loss modulus (imaginary part of $K^*_{eq}$).

In a manner similar to that of estimating the equivalent real stiffness per unit length, the loss factor will be estimated by calculation using equation (3), equations (1) and (2) serving to calculate $K'_{eq}$ and $K''_{eq}$, $K'_{eq}$ and $K''_{eq}$ being estimated by calculation using the measurement by the viscoanalyzer of the real part and of the imaginary part of the complex Young's modulus of each constituent material of the strip, respectively. The measurement from the entire strip using the viscoanalyzer will be used to confirm the calculations, particularly when selecting materials of any non-rectangular cross section.

In all cases, to ensure that the strip meets the claimed criterion that will be presented below regarding this loss factor, a measurement of the equivalent real stiffness per unit length by the viscoanalyzer and a calculation of the loss factor will be made.

According to the invention, the strip 3 exhibits acoustic damping properties when the equivalent loss factor tan $\delta_{eq}$ of the strip is equal to at least 0.25.

The equivalent loss factor and the equivalent real stiffness per unit length depend not only on the chemical nature of the material or materials of the strip but also on the geometry given to the cross section of the strip. In addition, when a strip meets the claimed criteria according to the invention regarding the equivalent loss factor and the equivalent stiffness per unit length, it is possible to optimize these parameters by modifying them so as to further enhance the acoustic performance.

These parameters are modified by changing the dimensions of the cross section of the strip. For example, if the strip is formed from a single material and has a rectangular cross section, its equivalent real stiffness per unit length is then increased by reducing the thickness e of the strip and by increasing its width L.

The strip 3 may be formed structurally in various ways.

Figure 1B:
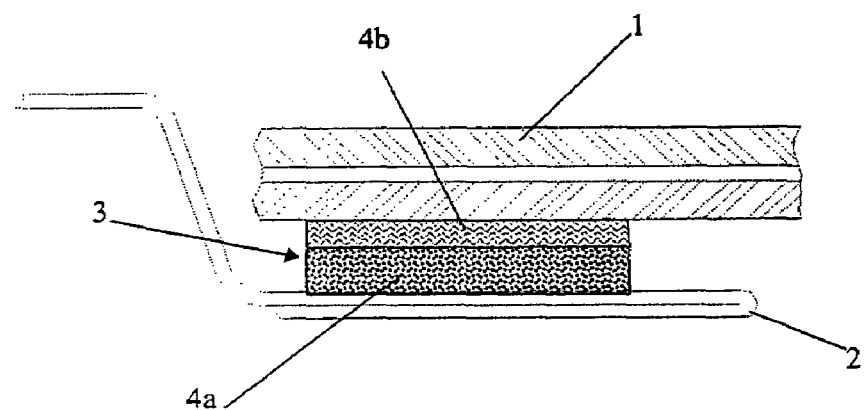
Figure 1C:
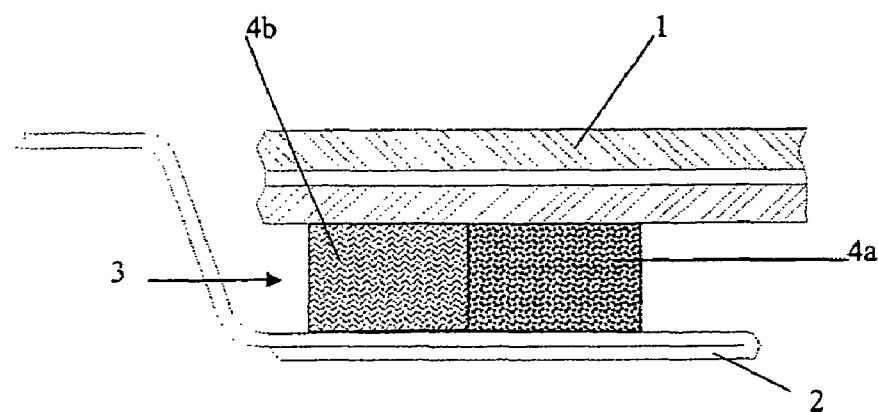

According to a first embodiment illustrated in FIGS. 1a to 1c, the strip 3 is formed from at least one damping material 4 that fulfillls the acoustic damping function and also the function of bonding the two elements together and optionally the sealing function, depending on the type of use for which the strip is intended. In the example in question of glazing for an automobile, the strip preferably also fulfillls the sealing function. This strip configuration comprising one or more damping materials that also fulfill an adhesive function for bonding the two elements together will be called in the rest of the description a monolithic strip.

According to this first embodiment, a first version (FIG. 1a) consists in making the strip from a single material that meets the stipulated criteria as regards the equivalent loss factor and the equivalent real stiffness per unit length and that has the properties of adhesion to the two elements 1 and 2, and if necessary sealing properties.

A second version of the first embodiment consists in making the strip 3 from two damping materials 4a and 4b that meet the criteria of the invention. These materials, one of which may be relatively more damping or less damping than the other, result, when they are combined, in an equivalent real stiffness per unit length and an equivalent loss factor that meet the damping criteria. They are placed as layers one on top of the other (FIG. 1b) or are juxtaposed one beside the other (FIG. 1c) and optionally separated by an air gap (not illustrated). Both materials exhibit adhesion properties with respect to at least one of the two elements to which they are joined.

It is also possible to envision more than two damping materials taken in combination as a juxtaposition or as a stack (not illustrated).

Examples of materials that can be used for a monolithic strip will be mentioned later in the description.

According to a second embodiment illustrated in FIGS. 2a to 2d, 3a to 3d and 4a to 4d, the strip 3 is formed from at least one damping material 4 and from a nondamping adhesive material 5. The material 4 provides the acoustic damping function and is bonded to at least one of the two elements 1 and 2 to be joined together, whereas the adhesive material 5 provides the function of bonding the two elements 1 and 2 together, being bonded to at least one of the two elements 1 and 2. The materials 4 and 5 are chemically compatible in order to guarantee, if necessary, depending on the embodiment, their mutual adhesion. The materials 4 and 5 may exhibit sealing properties depending on the use of the strip.

In this second embodiment, the nondamping adhesive material 5 serves merely to bond the two elements 1 and 2 and also has sealing properties. By itself it has no acoustic damping property. However, it is necessary for it to have an appropriate thickness and width, since it has a Young's modulus $E_i'$ and a loss factor tan $\delta$ that have an influence on the equivalent real stiffness per unit length and the equivalent loss factor of the entire strip 3 and therefore on the acoustic damping properties of the entire strip 3.

In this second embodiment, the arrangement of the materials between the two elements may vary.

It may be of the stacked type (FIGS. 2a to 2d), i.e. the materials are arranged in layers one on top of another, each of the materials at the ends of the stack being bonded to one of the two elements 1 and 2 to be joined together.

It may be of the juxtaposed type (FIGS. 3a to 3d), i.e. the materials may or may not be beside one another, each of the materials having two opposed surfaces bonded to the two elements 1 and 2 to be joined together, respectively.

A third type of version of the second embodiment is an arrangement in which a stack is combined with a juxtaposition (FIGS. 4a to 4d), at least one or two materials partly constituting this combination being bonded to the two elements 1 and 2 to be joined together.

FIG. 2a to 2d therefore illustrate different versions of a stack arrangement.

Figure 2A:
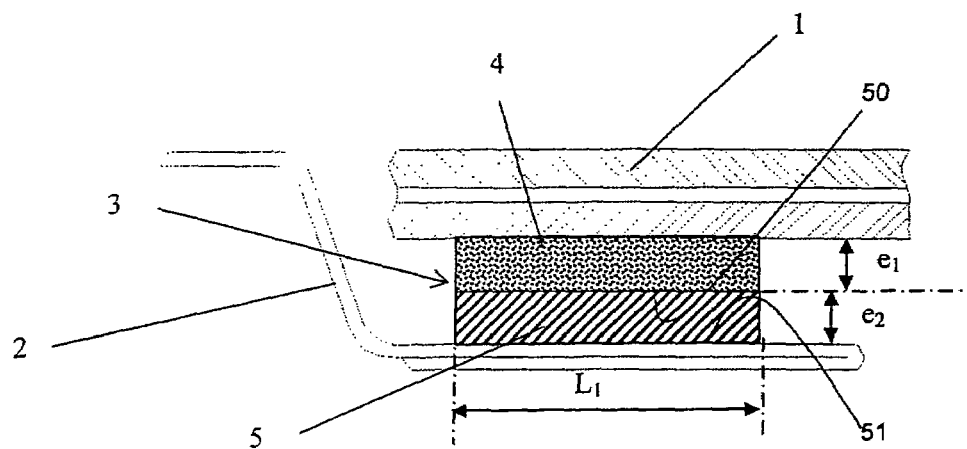
FIGS. 2a to 2d illustrate partial sectional views of two elements joined together by means of a strip according to versions of a second embodiment of the strip, the strip being formed from a stack of materials.
Figure 2B:
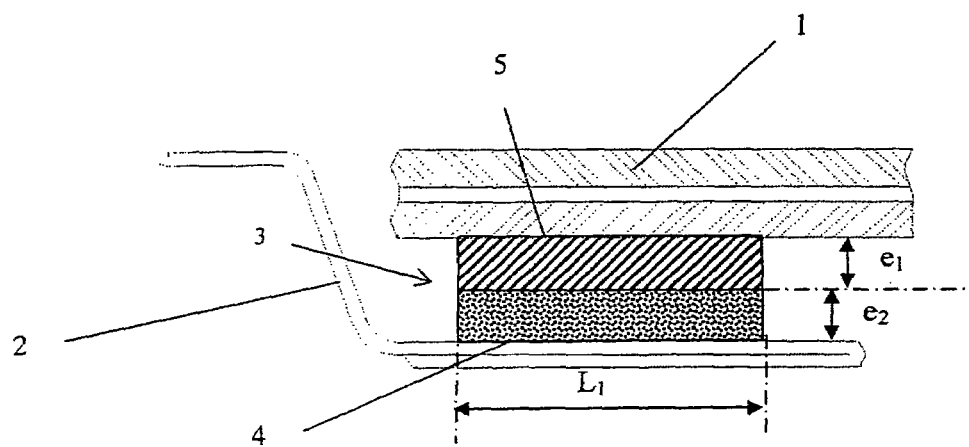

The stacks in FIGS. 2a and 2b consist of a material 4 with acoustic damping properties and of a nondamping material 5 for adhesion of the strip to one of the elements. In FIG. 2a, the material 4 is bonded to the element 1—the glass substrate—and the adhesive material 5 adheres via one of its faces 50 to the damping material 4 and adheres by its opposite face 51 to the element 2—the bodywork, whereas in FIG. 2b the materials 4 and 5 are bonded to the bodywork and to the glass substrate, respectively. The layers of material have the same width L1 and each has a thickness e1, e2 that is tailored to the nature of the material, and therefore to the loss factor of each material so as to optimize the equivalent real stiffness per unit length and/or the equivalent loss factor of the strip.

Figure 2C:
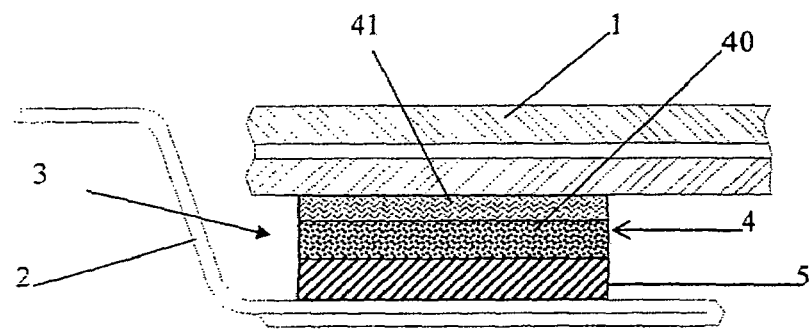
Figure 2D:
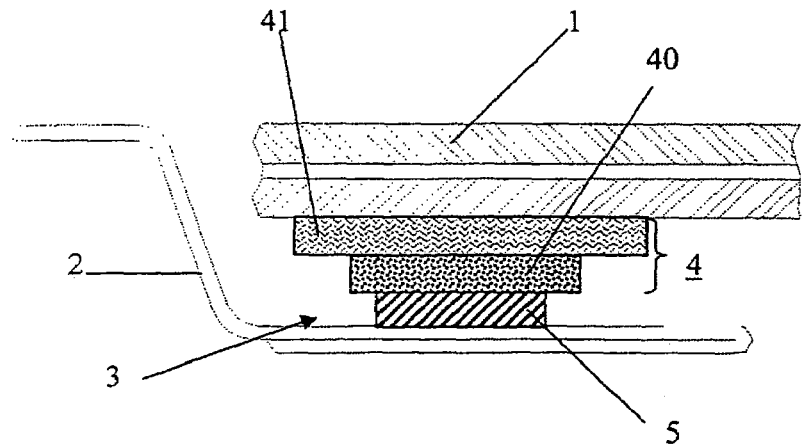

FIGS. 2c and 2d correspond to a stack of three materials—two materials 40 and 41 constitute the damping material 4 and the third material constitutes the adhesive material 5. The layers of material are of identical width in the case of FIG. 2c, but of different width in the case of FIG. 2d, the thickness of each of the layers being designed to optimize the equivalent real stiffness per unit length and/or the equivalent loss factor of the strip 3.

FIGS. 3a to 3d illustrate different versions of the juxtaposed arrangement.

Figure 3A:
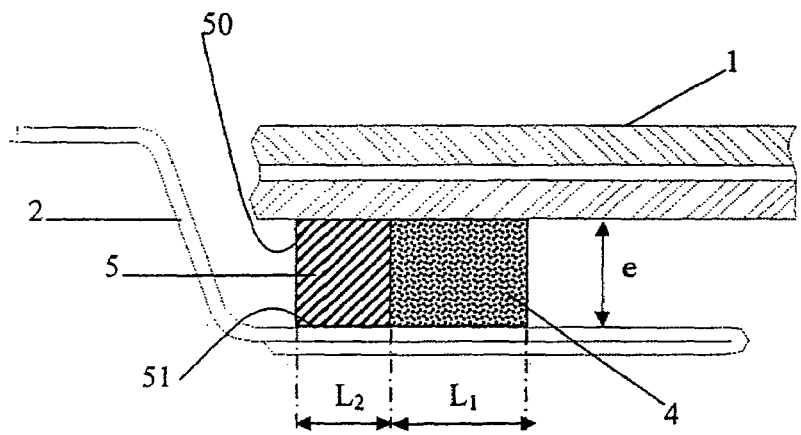
FIGS. 3a to 3d illustrate partial sectional views of two elements joined together by means of a strip according to versions of a second embodiment of the strip, the strip being formed from a juxtaposition of materials.

In FIG. 3a, the juxtaposition of two materials consists of a damping material 4 placed beside an adhesive material 5, both having the same thickness and bonded by two of their opposed faces, 50 and 51 in the case of the adhesive material, to the two elements 1 and 2, namely the glass substrate and the bodywork. Their widths L1 and L2 are defined so as to optimize the calculation of the equivalent real stiffness per unit length and/or the equivalent loss factor.

Figure 3B:
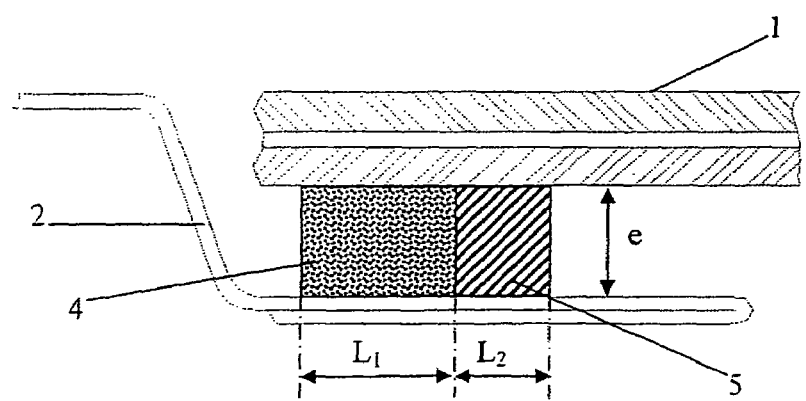

FIG. 3b shows the materials 4 and 5 in FIG. 3a reversed, the nondamping adhesive material being placed on the side facing the passenger compartment of the vehicle.

Figure 3C:
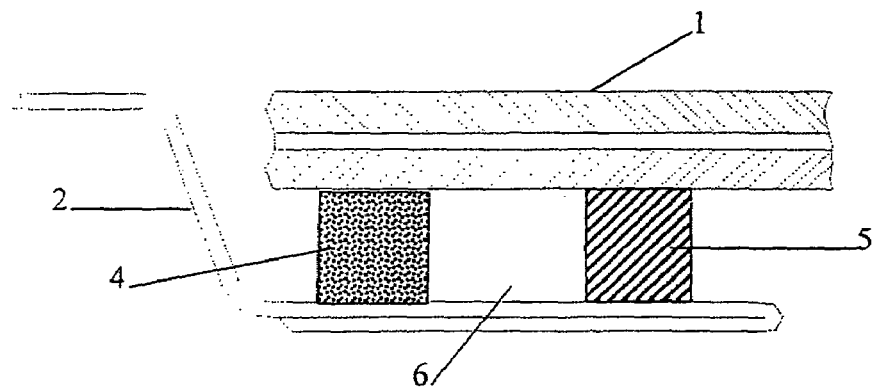

FIG. 3c is a repeat of FIG. 3a, except that the materials are not beside each other but separated by an air gap 6.

Figure 3D:
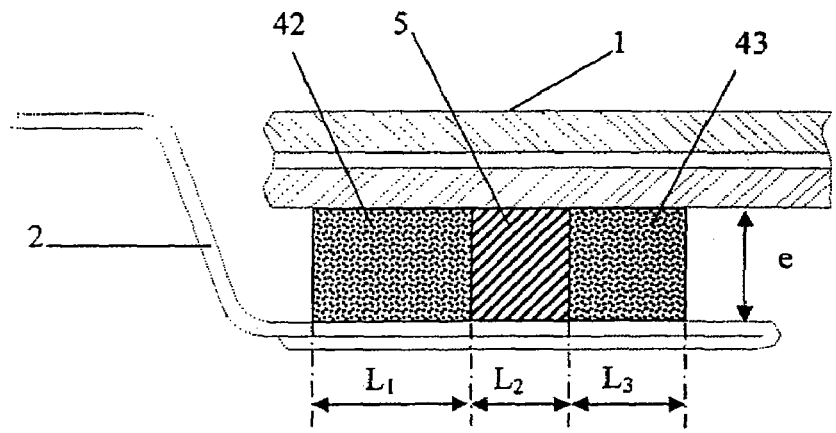

FIG. 3d is representative of a juxtaposition of three materials beside one another—a nondamping adhesive material 5 sandwiched between two damping materials 42 and 43 that constitute the damping material 4. The materials 42 and 43 may or may not be different.

Depending on the thickness of the various materials placed in juxtaposition, the width of each damping material 4 (and therefore also 42 and 43) and of each adhesive material 5 is designed to ensure that the equivalent real stiffness per unit length and the equivalent loss factor of the combination of materials, and therefore of the strip 3, are sufficient for the desired acoustic damping.

FIGS. 4a to 4d show a combination of stacked and juxtaposed arrangements, at least the adhesive material being bonded via two opposed faces to the elements 1 and 2 to be joined together.

Figure 4A:
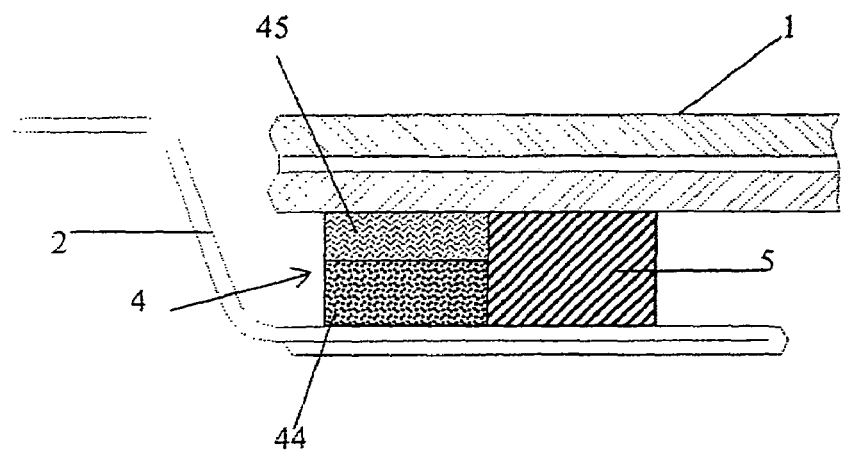
FIGS. 4a to 4d illustrate partial sectional views of two elements joined together by means of a strip according to versions of a second embodiment of the strip, the strip being formed from a combination of one or more stacks and one or more juxtapositions of materials.

FIG. 4a is a juxtaposition of the adhesive material 5 and the damping material 4, the latter being formed from a stack of different materials 44 and 45, one being more damping than the other.

Figure 4B:
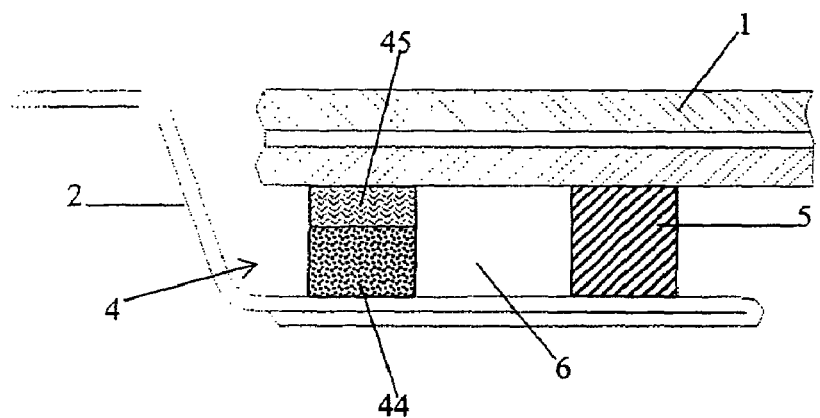

FIG. 4b is a repeat of FIG. 4a, except that the adhesive material 5 and the damping material 4 (44, 45) are separated by an air gap 6.

Figure 4C:
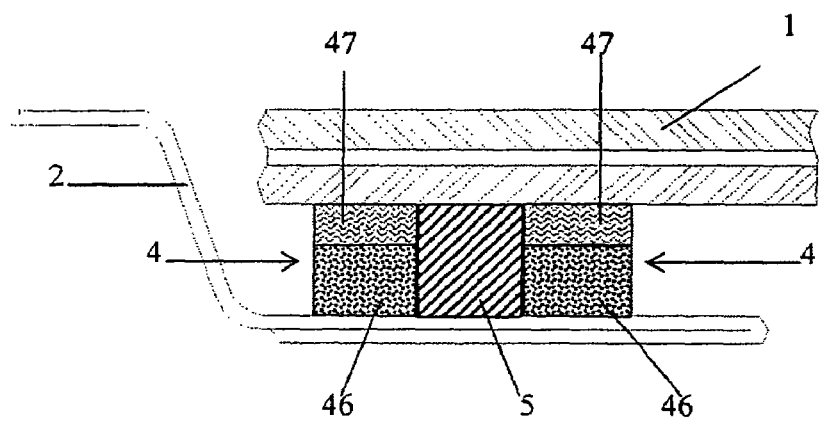

FIG. 4c illustrates a juxtaposition of several materials beside one another, the adhesive material 5 being sandwiched between damping materials 4 that consist of two stacks of at least two different materials 46, 47, it being possible for the stacks to differ from each other.

Figure 4D:
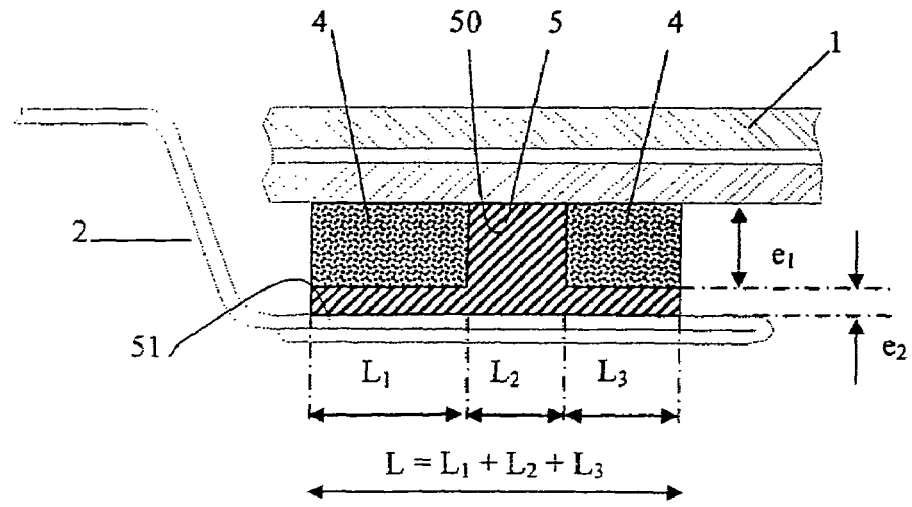

FIG. 4d illustrates a juxtaposition of three materials beside one another—the adhesive material 5 and two damping materials 4 that may or may not be different. The adhesive material 5 is sandwiched between the two damping materials 4 and has one of its faces, 51, that extends over the width L of the strip and is bonded to one of the elements 2 so that the materials 4 are stacked with a thickness e1 on a thickness e2 of the material 5. The opposite face 50 of the adhesive material 5 is bonded to the other element 1 and has a width L2, whereas the materials 4 are placed against said element 1 with widths of L1 and L3.

In the second embodiment, in which the nondamping adhesive material 5 is different from the damping material 4, the adhesive material 5, which is also used to provide the sealing function, is for example a polyurethane mastic such as GURIT BETASEAL 1720 sold by Dow Automotive. In the example given, it seals the glazing with respect to the bodywork and is impermeable to gases, dust, water vapor, liquid water and solvents.

The inventors have identified several plastics that can provide the damping properties required of the damping material 4 of the first embodiment or of the second embodiment in any of the versions referenced 40 to 47.

For example, mention may be made of:

plasticized or unplasticized polyvinyl chloride;

thermoplastic elastomers;

one-component or two-component polyurethanes, possibly modified by an elastomer, such as polyolefins, EPDM (ethylene-propylene-diene) or rubber, especially butyl rubber or nitrile rubber or styrene-butadiene rubber;

polyalkyl acrylate or methacrylate copolymers; and epoxy resins.

The compositions mentioned above may furthermore contain organic or mineral fillers, such as talc, silica, calcium carbonate, kaolin, alumina, molecular sieve, carbon black, graphite or pyrogenic silica, and metal fillers such as zinc oxide, titanium oxide, alumina or magnetite. The filler content may vary between 0 and 50% by weight of the final composition.

As regards thermoplastic elastomers (TPE), these consist of blends of polymers or of block copolymers exhibiting a thermoplastic phase and an elastomer phase, optionally these being chemically bonded together in the case of copolymers.

As regards polyurethanes, thermoplastic urethanes (TPU), that exist for example in the form of a nonreactive polymer obtained from several polyol sources, at least one form of which is a block having thermoplastic properties and at least one other form of which is a block having elastic properties, may be considered.

It is also possible to select a polyurethane-based material with a wide variety of reactive compositions of the one-component or two-component type. As an example, mentioned may especially be made of one-component compositions based on a polyurethane prepolymer with a polyester, polyether, polycaprolactone, polyolefin or polysiloxane backbone. The advantage of a siloxane-terminated prepolymer is that it is moisture-curable and does not foam. These polyurethane compositions may be modified by an elastomer, especially by a nitrile, SBR or butyl rubber, or by a thermoplastic elastomer or else by a non-crosslinkable polymer having a certain flexibility, such as polyolefins or plasticized PVC.

Among the moisture-crosslinkable and/or thermally crosslinkable one-component polyurethane prepolymer compositions are those obtained by reaction between polyols and polymeric or nonpolymeric diisocyanates.

The polyols of the compositions may be polyetherpolyols, of the polyethylene, propylene oxide or polytetramethylene oxide type, a polycarbonate polyol or polybutadiene polyol or polyesterpolyols, these being amorphous or crystalline, aromatic or aliphatic, and based on fatty acid dimers, aromatic or aliphatic diacids, castor oil or chain extenders of the 1,3- or 1,4-butanediol, diisopropyl glycol, 2,2-dimethyl-1,3-propanediol, hexanediol or carbitol type. The molecular mass of these polyols will be defined by their hydroxyl index (iOH) defined in the ASTM E 222-94 standard as the number of milligrams of potassium hydroxide equivalent to the hydroxyl content of 1 gram of polyol. The NOH range used is between 5 and 1500. The functionality of these polyols will be between 2 and 6.

The isocyanates may be aromatic or aliphatic, among which are diphenyl-methane diisocyanates (MDI), toluene diisocyanates (TDI), isophorone diisocyanates (IPDI) and hexane diisocyanate (HDI). The nature of the isocyanates is also defined by their NCO percentage content which, in the ASTM D 5155-96 standard, is defined as the proportion by weight of isocyanate (NCO) functional groups present in the product. The functionality of the products is between 2 and 2.7.

The catalysts needed for the reaction between the polyols and the isocyanates may be tin catalysts such as dibutyltin dilaurate (DBTDL) or tin octoate. It is also possible to use bismuth catalysts or catalysts based on morpholines, such as dimorpholinodiethyl ether (DMDEE).

To prevent the selected prepolymer from foaming, it is possible to add an antifoam additive, which is a compound based on bisoxazolidines. Finally, various plasticizers may also be advantageously added to the prepolymer selected.

Figure 5:
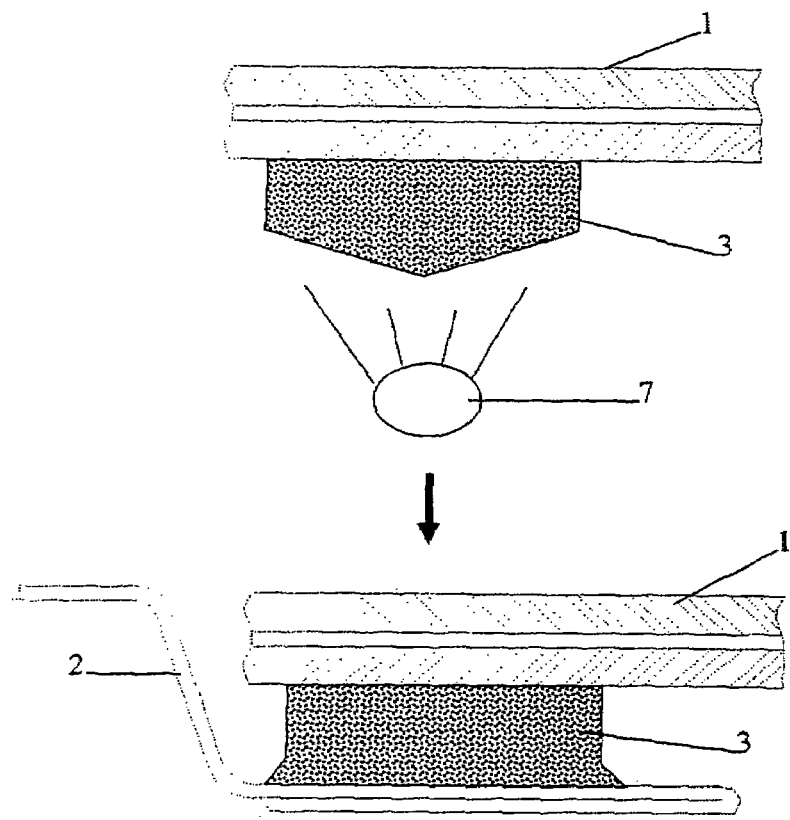
FIG. 5 shows schematically the steps for joining two elements together by means of the strip according to the first embodiment.

In general, the strip 3 is applied between the elements 1 and 2 in the following manner (FIG. 5): the strip 3 is deposited on the element 1 by an application technique that we will expand upon in the rest of the description. Depending on the chemical nature of the free surface of the strip to be joined to the element 2, this surface is either conventionally bonded, as it has bonding properties at room temperature, or else this free surface is activated using an energy source 7 of the infrared, ultraviolet, high-frequency, microwave or induction type, and when the surface reaches a suitable temperature, the strip joined to the first element 1, such as the substrate, is pressed against the second element 2, such as the bodywork, in order to bond them together. The amount of energy and the thickness of the activated material or materials are gaged in order to obtain the final width and thickness that are desired between the two elements 1 and 2.

The strip 3 may be applied against the first element in various ways. The technique employed may depend on the nature of the material or materials and on the arrangement—stacked and/or juxtaposed—of the materials.

At least four techniques for depositing the gaged strip may be used, separately or in combination: extrusion, overmolding (encapsulation) and transfer from a molding. As regards the transfer process, reference may be made for further details to French patent application FR 01/15039.

The extrusion technique ensures that the strip has a constant geometry. Advantageously, the shape given to the strip may make it easier for it to be bonded to the element to which it is joined in order to guarantee the desired geometry. The damping materials used must have viscosities between 100 and 500 Pa·s at 80° C., the materials setting below 50° C. The materials will therefore have a green strength and a thixotropy that are sufficient to maintain their geometry after extrusion. Preferably, they will be of the one-component type and will ensure good bonding to the first element being joined to it, such as the glass substrate in the example cited.

Figure 6:
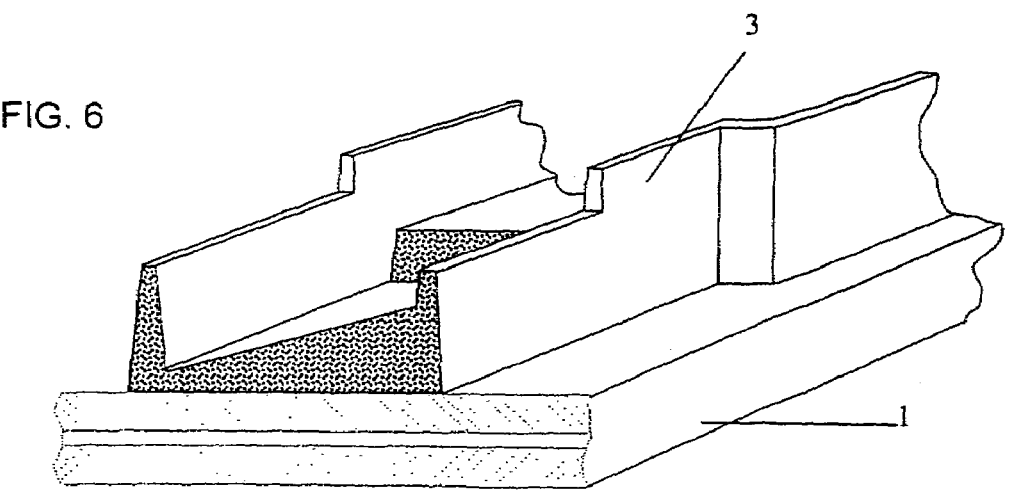
FIG. 6 shows a side view of one version of a strip bonded to one of the elements to be joined together.

In the second technique, the strip may be overmolded on one of the elements so as advantageously to give it any of the desired shapes and thus optimize the acoustic performance, while guaranteeing the dimensions of the strip at any point on the glazing, as it may be necessary for the width and the thickness of the strip not to be uniform over the entire perimeter of the element to which it is joined for the requirements of the acoustic performance (FIG. 6). The viscosity of the materials used must not exceed a certain limit and the setting of a two-component product must be rapid.

In the third technique, the strip may also be molded and transferred to one of the elements in order to preserve the advantages of the molding and to reduce the mold production costs. This technique combines the advantages of extrusion and overmolding, as it allows several layers of materials of various shapes to be created, as illustrated in FIG. 2d. As in the case of extrusion, a minimum green strength and a minimum viscosity of the materials are required for moisture-crosslinking one-component materials. The setting time may be rapid if thermally crosslinking one-component-type systems are employed. As regards two-component systems, these set rapidly.

Finally, an injection molding technique is also conceivable. In this case, the element to which the material has to be joined is placed in a mold having a cavity corresponding to the shapes of the strip that it is desired to produce and molding material formed by the damping material is injected in the molten state into the mold.

Among the examples of techniques used, a distinction will be made below between joining the two elements together according to the first embodiment of the strip, that is to say as a monolithic strip, and according to the second embodiment, namely when the strip comprises at least two materials 4 and 5 corresponding to the damping material and to the nondamping adhesive material, respectively.

In the case of a monolithic strip 3, it is applied against the glass substrate 1 by selecting one of the four techniques.

As regards extrusion against the element 1, therefore with a single damping material 4 that also provides the function of bonding to the element, the inventors have developed a material A that meets the criteria of the invention, the surface of which is activatable so as to be bonded to the element 2. This is a moisture-crosslinking one-component polyurethane having a single glass transition temperature $T_g$ and comprising:

- at least one polyesterpolyol with a functionality of two (preferably between 80 and 200 g), having an OH index iOH of between 5 and 10, a glass transition temperature $T_g$ of −50° C. or below and a softening point between 50 and 80° C.;
- at least one polyesterpolyol with a functionality of two (preferably between 120 g and 220 g), having an index iOH between 50 and 100 and a glass transition temperature $T_g$ of −50° C. or below;
- at least one isocyanate with a functionality of between 2.1 and 2.7 of the diphenylmethane diisocyanate (MDI) type and having an NCO percentage content of between 11 and 33% (preferably between 180 and 220 g);
- at least one catalyst (preferably between 0.5 and 3 g);
- optionally, a filler of the molecular sieve type (preferably between 20 and 60 g); and
- optionally, at least one filler of the chalk, kaolin, talc, alumina, carbon black or graphite type (preferably between 5 and 60 g).

The NCO percentage content of this polyurethane prepolymer A is between 0.5 and 2%.

For such a material A used to form a strip of rectangular cross section equal to the reference cross section L×e=15 mm×3 mm, the value of the Young's modulus E' measured at 120 Hz and at an ambient temperature of 20° C. is 80 MPa. The equivalent loss factor, consisting of the loss factor of the single material is then equal to 0.3 and the equivalent real stiffness per unit length is equal to 400 MPa.

For the application of a strip 3 formed from at least two materials 4 and 5 according to the second embodiment, it is possible to coextrude the two materials onto the glass substrate 1. After this first step, the bonding is effected by heating the free surface of the strip and by applying it against the bodywork (FIG. 7), or else by applying the free surface directly against the bodywork, depending on the nature of the materials.

Alternatively, it is possible to overmold or transfer after molding, onto the glass substrate, the damping material 4, giving it the desired shape (FIGS. 8a to 8f). The adhesive material 5 is then deposited on the free surface of the damping material 4 by extrusion (FIG. 9). It is thus possible to give the damping material a particular profile with, for example, rims 48 (FIGS. 8a, 8b, 8c) that serve to guide the adhesive material and to define the thickness and/or the width of said adhesive material during its deposition, or else, for example, with central projections 49 (FIGS. 8d, 8e, 8f) that allow the thickness of the adhesive material to be gaged. For bonding, the surface of the adhesive material 5 deposited on the damping material 4 is, if necessary, heated and the strip is pressed against the bodywork (FIG. 9).

If the strip 3 is formed from an adhesive material 5 and two damping materials 40 and 41 of the stacked type, the two damping materials may be coextruded onto the glass substrate 1 as illustrated by the two versions in FIGS. 10a and 10b. The deposition of the adhesive material 5 on the free surface of the damping material on the opposite side from the substrate and the bonding are then carried out as illustrated in FIG. 9.

Figure 11B:
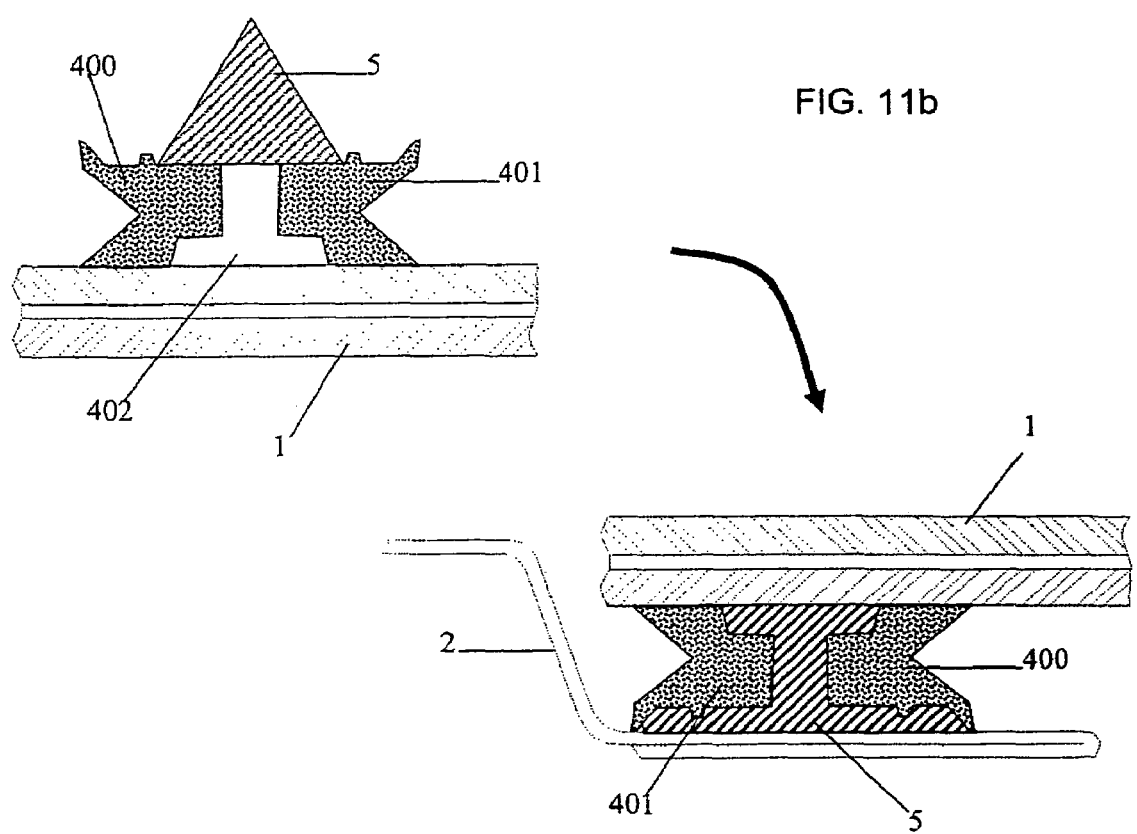

FIGS. 11a and 11b show the steps of bonding the element 1 to the element 2 by means of two respective versions of a strip of the type illustrated in FIG. 4d. The material 4 is firstly molded and transferred to the element 1. It has a particular geometry, in particular it is separated into two parts 400 and 401 so as to form a receiving channel 402 for housing the adhesive material 5 during bonding. The adhesive material 5 has in the end two opposed faces bonded to the two elements 1 and 2, respectively.

One example of a strip, comprising at least one damping material 4 and at an adhesive material 5, is formed from a material B as damping material 4 and from an adhesive mastic 5, such as a nondamping polyurethane mastic. Each of the materials has a rectangular cross section 15 mm in width and 3 mm in thickness, representing a total cross section equal to the reference cross section in the case of the strip 15 mm in width and 6 mm in thickness.

The material B of composition developed by the inventors is of the moisture-crosslinking one-component polyurethane type with a single glass transition temperature and comprising:

at least one polyesterpolyol with a functionality of two (preferably between 350 and 450 g), having an OH number between 20 and 40 and a glass transition temperature $T_g$ of between −40 and −20° C.;

at least one polyesterpolyol with a functionality of two, having an OH number between 30 and 90 (preferably between 35 and 250 g), a glass transition temperature $T_g$ between 0 and 30° C. and a softening point between 50 and 70° C.;

at least one isocyanate having a functionality between 2.1 and 2.7 of the diphenylmethane diisocyanate (MDI) type and an NCO percentage content of between 11 and 33% (preferably between 150 and 230 g);

at least one catalyst (preferably between 0.5 and 3 g);

optionally, a filler of the molecular sieve type (preferably between 20 and 80 g); and optionally, at least one filler of the chalk, kaolin, talc, alumina, carbon black or graphite type (preferably between 5 and 60 g).

The NCO percentage content of this polyurethane prepolymer B is between 0.5 and 2%.

The Young's modulus and loss factor values of the damping material B at an ambient temperature of 20° C. are the following: E'=35 MPa and tan δ=1.4.

The Young's modulus and loss factor values of the nondamping adhesive material 5 made of a polyurethane mastic, at 120 Hz and at an ambient temperature of 20° C., are the following: E'=21 MPa and tan δ=0.2.

The equivalent real stiffness per unit length and the equivalent loss factor values are equal to 70 MPa and 0.95, respectively.

The inventors have also developed another damping material C that has adhesive properties, particularly with an adhesive strength at low temperature (between −60 and −10° C.). This material, unlike the materials A and B, has two glass transition temperatures. It is a polyurethane prepolymer comprising:

at least one polyetherpolyol with a functionality of two, having an index iOH of between 25 and 35, a glass transition temperature $T_g$ below −50° C. and a molecular mass between 3500 and 4500;

at least one polyetherpolyol with a functionality of between 2.3 and 4, having an index iOH between 25 and 800 and a glass transition temperature $T_g$ below −50° C.;

at least one polyesterpolyol with a functionality of two, having an index iOH between 20 and 40 and a glass transition temperature $T_g$ between 40 and −20° C.;

at least one polyesterpolyol with a functionality of two, having an index iOH between 30 and 90, a glass transition temperature $T_g$ between 0 and 30° C. and a softening point between 50 and 70° C.;

at least one isocyanate with a functionality of between 2.1 and 2.7 of the diphenylmethane diisocyanate (MDI) type and an NCO percentage content between 11 and 33%;

at least one catalyst;

optionally, a filler of the molecular sieve type; and optionally, a filler of the chalk, kaolin, talc, alumina, carbon black or graphite type.

The NCO percentage content of this polyurethane prepolymer is between 0.5 and 2%.

In particular, we may describe as compound in accordance with composition C above, the NCO % content being between 1.8 and 2.2%, and comprising:

between 180 and 220 g of a polyetherpolyol with a functionality of two, having an index iOH between 25 and 35, a glass transition temperature $T_g$ below −50° C. and a molecular mass between 3500 and 4500;

between 75 and 115 g of an isocyanate of the MDI type having an NCO % content equal to 11.9%;

between 5 and 30 g of carbon black;

between 0.5 and 3 g of catalyst;

between 10 and 30 g of pyrogenic silica;

between 135 and 180 g of a liquid and amorphous polyesterpolyol A with an index iOH between 27 and 34, a molecular mass of 3500, a functionality of two and a glass transition temperature $T_g$ of −30° C.;

between 35 and 85 g of a liquid and amorphous polyesterpolyol B with an index iOH between 27 and 34, a molecular mass of 3500, a functionality of two and a glass transition temperature $T_g$ of +20° C., respectively;

between 55 and 110 g of an MDI-type isocyanate, with an NCO % content of 11.9%; and between 20 and 80 g of molecular sieve.

For such a material C used to form a strip of rectangular cross section equal to the reference cross section L×e=15 mm×3 mm, the value of the Young's modulus E' measured at 120 Hz and 20° C. is 22 MPa. The equivalent loss factor, which consists of the loss factor of the single material, is equal to tan δ=0.75 and the equivalent real stiffness per unit length is equal to 120 MPa.

This material C having two glass transition temperatures may also very well be used at low temperature, as it exhibits not only acoustic damping properties but also adhesive strength. In fact, at −40° C., the loss factor is equal to 0.38 and the value of Young's modulus is 900 MPa, the inventors defining the adhesive strength property, that is to say when there is no risk of adhesive failure between the material and the element to which it is joined, such that the rigidity E' of the material is less than 2000 MPa for a frequency between 50 and 500 Hz.

The inventors have therefore succeeded in selecting damping material compositions that meet the equivalent real stiffness per unit length and equivalent loss factor criteria stipulated by the invention. To check whether the material or materials to be used in a strip with acoustic damping properties and the shape of the cross section of this or these materials do meet the criteria provided by the invention, the inventors have established a method of evaluation.

When dealing with rectangular cross sections of materials, it is necessary:
  to measure the Young's modulus $E_i'$ and the loss modulus $E_i''$ of the material or materials to be used for the strip;
  to evaluate the equivalent real stiffness per unit length $K'_{eq}$ and the equivalent loss factor tan $\delta_{eq}$ from the abovementioned equations (1), (2) and (3); and
  finally, to compare these $K'_{eq}$ and tan $\delta_{eq}$ values of the strip with the reference values, 25 MPa and 0.25 respectively, above which the acoustic properties are obtained.

It will be possible to optimize the values of these parameters, and therefore to achieve better noise attenuation, by varying the thicknesses and widths of the materials.

The Young's modulus $E_i'$ and loss modulus $E_i''$ values of each material are measured using a viscoanalyzer like the one sold under the brand name METRAVIB under the measurement conditions given below:
  sinusoidal stressing;
  material specimen formed from a rectangular parallelepiped with dimensions that lie within the ranges defined by the manufacturer of the visco-analyzer, for example:
    thickness e=3 mm
    width L=5 mm
    height=10 mm
  dynamic amplitude: ±5×10$^{-6}$ m around the rest position,
  frequency range: 5 to 400 Hz
  temperature range: −60 to +60° C.

The viscoanalyzer allows a material specimen to be subjected to deformation stresses under precise temperature and frequency conditions, and in this way to obtain and treat all the rheological, quantities that characterize the material.

The raw data—force, displacement and phase shift measurements as a function of frequency at various temperatures—is used in particular to establish the Young's modulus $E_i'$ and the loss modulus $E_i''$ of the material.

To confirm the method of evaluation, described above, for seeking materials and dimensions, and in all cases to ensure that a strip has the features claimed by the invention, the viscoanalyzer is used to make direct measurements of the equivalent real stiffness and the equivalent loss modulus of a strip specimen of cross section identical to that of the strip and of length L. The following then have to be calculated:
  the ratio of the measured equivalent real stiffness to the length L in order to obtain the equivalent real stiffness per unit length $K'_{eq}$ of the strip: $K'_{eq}=k'_{eq}/L$; and
  the ratio of the measured equivalent loss factor to the measured equivalent real stiffness in order to obtain the equivalent loss factor tan $\delta_{eq}$ of the strip:

$$\frac{k''_{eq}}{K'_{eq}}.$$

Figure 12:
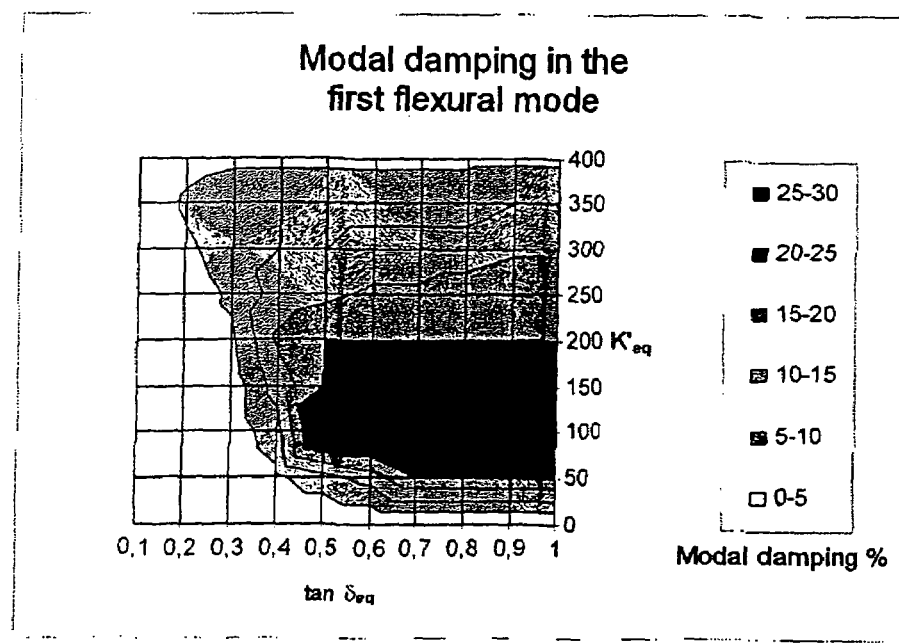
FIG. 12 shows the modal damping in the first flexural mode obtained on a glass substrate provided with the strip, as values of the equivalent real stiffness per unit length $K'_{eq}$ plotted against values of the equivalent loss factor tan $\delta_{eq}$.

Finally, the inventors have chosen to illustrate the acoustic performance of the strip 3 by plotting the equivalent real stiffness per unit length $K'_{eq}$ as a function of the equivalent loss factor tan $\delta_{eq}$ in the graph shown in FIG. 12. The values of the equivalent loss factor are plotted on the x-axis and the values of the equivalent real stiffness per unit length are plotted on the y-axis. On the basis of these values, the graph indicates the modal damping in the first flexural mode measured on a glass substrate (800 mm by 500 mm and 4 mm in thickness) bonded to a bed by means of the strip placed around the periphery and on one face of the substrate, it being possible for the equivalent loss factor tan $\delta_{eq}$ to be between 0.15 and 1, and for the equivalent real stiffness per unit length not to exceed 400 MPa. It may be noted that the values of the gains given for tan $\delta_{eq}$=1 may be extrapolated to tan $\delta_{eq}$>1 for the same values of the equivalent stiffness.

The modal damping is expressed on a scale of 0 to 30%. The greater the damping, the higher the acoustic gain in dB.

The modal damping in the first flexural mode is defined as follows. The modal damping is deduced from measurements of the mechanical impedance Z (modulus of the frequency response function giving the vibration speed normal to the glass substrate at one point as a function of the point load applied at this same point in the direction normal to said substrate) made using an impact hammer and an accelerometer at the center of the substrate.

The frequency of the first flexural mode corresponds to that frequency below 120 Hz for which the mechanical impedance is a maximum. It is denoted by f1. The value of the mechanical impedance of the frequency f1 is denoted by Zmax.

The bandwidth at mid-height corresponds to the width of the frequency range around f1 for which Z>Zmax/√2. It is denoted by Δf.

The modal damping of the first flexural mode corresponds to the ratio Δf/f1.

The graph shows from the values that the modal damping and therefore the acoustic performance (gain in dB) are variables for a given loss factor and different equivalent stiffnesses, or vice versa.

Thus, it is possible to obtain a modal damping close to 30% for an equivalent real stiffness per unit length of 100 MPa and a loss factor between 0.5 and 1, whereas the damping does not exceed 5% if the loss factor is only 0.3 for the same real stiffness per unit length of 100 MPa.

It may also be seen that for a loss factor of 0.8 for example, the optimum equivalent real stiffness per unit length will be around 100 MPa and that increasing the equivalent real stiffness per unit length will only decrease the modal damping that can be obtained.

This graph demonstrates that the use of the material A, as explained above for a monolithic strip and having an equivalent real stiffness per unit length of 400 MPa and an equivalent loss factor of 0.3, generates modal damping of between 5 and 10%.

The use of the material B combined with a nondamping polyurethane mastic for the strip taken as the above example in the second embodiment, that has an equivalent real stiffness per unit length of 70 MPa and an equivalent loss factor of 0.95, generates modal damping of more than 20%.

Figure 13:
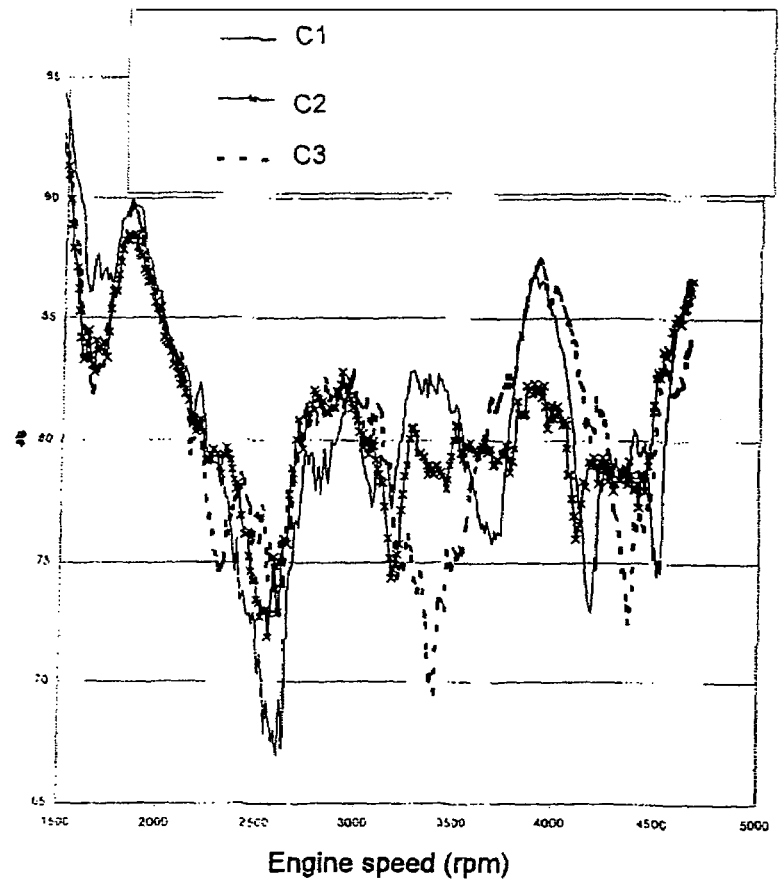
FIG. 13 shows curves of the measured noise as a function of the engine speed of an automobile for three types of strip.

Moreover, FIG. 13 shows three comparative curves of the noise measured inside an automobile as a function of the engine speed for three types of strip.

Curve C1 corresponds to a standard laminated glazing assembly equipped with a standard strip made from nondamping polyurethane mastic with a reference cross section of 9 mm by 6 mm.

Curve C2 corresponds to a standard glazing assembly equipped with a monolithic strip according to the invention formed from the damping material 4 of composition A with a reference cross section of 15 mm by 3 mm.

Curve C3 corresponds to a standard glazing assembly equipped with a strip according to the invention formed from the damping material 4 of composition B and from the nondamping adhesive material 5 made of a polyurethane mastic with a reference cross section of 15 mm by 6 mm.

The term "standard laminated glazing assembly" is understood to mean one comprising two 2.1 mm thick sheets of glass and a 0.76 mm thick interlayer film of polyvinyl butyral.

The table below gives the values of the equivalent real stiffness per unit length and the equivalent loss factor for the three types of strip.

| Type of strip; curve (reference cross section) | Equivalent real stiffness per unit length ($K'_{eq}$) in MPa | Equivalent loss factor ($\tan\delta_{eq}$) |
| --- | --- | --- |
| Polyurethane mastic; curve C1 (9 mm by 6 mm) | 31.5 | 0.2 |
| Material A, curve C2 (15 mm by 3 mm) | 400 | 0.3 |
| Material B and polyurethane mastic; curve C3 (15 mm by 6 mm) | 70 | 0.95 |

The curves in FIG. 13 demonstrate the improved noise reduction achieved thanks to the strip of the invention. In this figure, the noise expressed in dB is plotted as a function of the engine speed in rpm of the vehicle. The measured noise here is that generated within the 50-160 Hz frequency range, these frequencies corresponding to solid-borne noise and corresponding to an engine speed of 1 500 to 5 000 rpm with regard to the given type, of automobile taken here as example.

It should be noted that the measurements are independent of the area of the glazing assemblies.

The results show that at a frequency of 110 Hz, corresponding to 3 400 rpm and at a normal speed on a freeway, the noise measured on the glazing assembly corresponding to curve C1 is much higher than the noise measured on the glazing assembly corresponding to curve C2 and even more compared with that corresponding to curve C3; noise damping, of 4 dB and 13 dB respectively, is thus obtained thanks to the strip of the invention according to one of the two versions respectively, as may be seen also from the graph in FIG. 12.

It may be preferable to use the strip corresponding to curve C2, as this exhibits good damping performance at 3 400 rpm and also exhibits good performance for a speed above 4 000 rpm, for which it may be seen that the measured noise is 82 dB, whereas the measured noise corresponding to curve C1 with a standard strip is 87 dB. This result is obtained since the equivalent real stiffness per unit length of this strip of the invention is much greater than that of the standard strip.

The strip of the invention with acoustic damping properties has been described by way of example for the case in which it is inserted between two elements 1 and 2, such as a glass substrate and an automobile body, for the purpose of bonding one to the other, and therefore for a glass-metal joint. Other applications may be envisioned for the use of the acoustic damping strip of the invention, for example for metal-metal, glass-glass, metal-plastic, glass-plastic and plastic-plastic joints. The term "plastic" is understood to mean plastics such as an epoxy, a polyester, a polycarbonate, a polymethyl methacrylate (PMMA) or an acrylonitrile-butadiene-styrene resin, or composites based on a plastic, such as polypropylene (PP), and reinforcing fibers, such as glass fibers or wood fibers.

An example of a metal-metal joint is that of metal parts bonded to the bodywork of a vehicle. Thus, the mechanical components for opening the doors and windows that are normally attached by means of bolts may instead be attached by bonding using a damping strip of the invention in order to attenuate the radiation of noise into the passenger compartment of the vehicle.

An example of a glass-plastic joint is that obtained when bonding a rear window of a vehicle.

An example of a plastic-plastic or plastic-metal joint is that obtained when bonding the various elements that make up the tailgate of an automobile, or else the adhesive bonding of a roof based on a polyurethane foam reinforced with glass fibers to the metal body of the vehicle.

The invention claimed is:

1. A strip to be inserted between two substrates to cause acoustic attenuation of noise propagating through at least one of the two substrates,
    wherein the strip is formed from at least one plastic-based damping material,
    wherein the strip has an equivalent real stiffness per unit length $K'_{eq}$ equal to at least 25 MPa and an equivalent loss factor $\tan \delta_{eq}$ equal to at least 0.25,
    wherein at least one damping material is a one-component polyurethane that has an NCO percentage content of between 0.5 and 2% and comprises:
    at least one polyesterpolyol with a functionality of two, an OH index iOH of between 5 and 10, a glass transition temperature $T_g$ of −50° C. or below, and a softening point between 50 and 80° C.;
    at least one polyesterpolyol with a functionality of two, having an index iOH between 50 and 100 and a glass transition temperature $T_g$ of −50° C. or below;
    at least one isocyanate with a functionality of between 2.1 and 2.7 of the MDI type, and having an NCO percentage content of between 11 and 33%;
    at least one catalyst; and
    optionally, at least one filler.

2. The strip as claimed in claim 1, wherein the strip is formed from plural damping materials.

3. The strip as claimed in claim 2, wherein the damping materials exhibit adhesion properties with respect to the two substrates.

4. The strip as claimed in claim 1, wherein the strip is formed from at least one damping material and from a nondamping adhesive material, the adhesive material configured to bond the two substrates together.

5. The strip as claimed in claim 4, wherein the adhesive material adheres by two opposed faces to the two substrates respectively, the damping material being bonded to at least one of the two substrates.

6. The strip as claimed in claim 4, wherein the adhesive material adheres by one of its faces to the damping material that is bonded to one of the two substrates and adheres by its opposite face to the other of the two substrates to be joined together.

7. The strip as claimed in claim 2, wherein the strip comprises plural damping materials placed as a stack of layers one on top of another, each of the materials at ends of the stack being bonded to one of the two substrates to be joined together or to the adhesive material.

8. The strip as claimed in claim 2, wherein the strip comprises plural damping materials placed in juxtaposition one beside another, each of the materials having two opposed surfaces bonded to the two substrates to be joined together, respectively.

9. The strip as claimed in claim 7, wherein the strip comprises plural damping materials placed as a stack and in juxtaposition, at least one or two materials partly constituting the stack being bonded to the two substrates to be joined together.

10. The strip as claimed in claim 4, wherein the adhesive material is placed to be stacked with the at least one damping material, is placed in juxtaposition with the at least one damping material, or is placed to be stacked with and in juxtaposition with the at least one damping material.

11. The strip as claimed in claim 4, wherein the at least one damping material comprises at least two damping materials, and wherein the at least two damping materials are separated by an air space.

12. The strip as claimed in claim 4, wherein the nondamping adhesive material is a polyurethane mastic having a Young's modulus E' of 21 MPa and a loss factor tan δ of 0.2.

13. The strip formed from the at least one damping material as claimed in claim 1, wherein the strip has, at 20° C., with a reference cross section of 15 mm in width and 3 mm in thickness, an equivalent real stiffness per unit length of 400 MPa and an equivalent loss factor of 0.3.

14. The strip formed as a stack of the damping material as claimed in claim 1 and of a nondamping adhesive material of the polyurethane mastic type, wherein the strip has, at 20° C., with a cross section of 15 mm in width and 3 mm in thickness for each of the two materials, an equivalent real stiffness per unit length of 70 MPa and an equivalent loss factor of 0.95.

15. The strip as claimed in claim 1, wherein the strip is applied to at least one of the substrates by a process selected from the group consisting of extrusion, encapsulation, transfer from a molding, injection molding, and combinations thereof.

16. The strip as claimed in claim 1, wherein the strip has a uniform or nonuniform cross section over all or part of its length.

17. The strip as claimed in claim 1, wherein the strip is joined to two substrates comprising materials selected from the group consisting of metal-metal, glass-glass, metal-plastic, plastic-glass, and plastic-plastic.

18. The strip as claimed in claim 15, wherein the strip is used for attachment of a glazing to the body of a motor vehicle.

19. The strip as claimed in claim 18, wherein the glazing includes a laminated glazing assembly comprising at least two glass sheets and a film with acoustic properties.

20. A strip to be inserted between two substrates to cause acoustic attenuation of noise propagating through at least one of the two substrates,
   wherein the strip is formed from at least one plastic-based damping material,
   wherein the strip has an equivalent real stiffness per unit length $K'_{eq}$ equal to at least 25 MPa and an equivalent loss factor $\tan \delta_{eq}$ equal to at least 0.25,
   wherein at least one damping material is a one-component polyurethane that has an NCO percentage content of between 0.5 and 2% and comprises:
      at least one polyesterpolyol with a functionality of two, having an OH number between 20 and 40, and a glass transition temperature $T_g$ of between −40 and −20° C.;
      at least one polyesterpolyol with a functionality of two, having an OH number between 30 and 90, a glass transition temperature $T_g$ between 0 and 30° C., and a softening point between 50 and 70° C.;
      at least one isocyanate having a functionality between 2.1 and 2.7 of the MDI type and an NCO percentage content of between 11 and 33%;
      at least one catalyst; and
      optionally, at least one filler.

21. The strip as claimed in claim 20, wherein the strip is formed from plural damping materials.

22. The strip as claimed in claim 21, wherein the damping materials exhibit adhesion properties with respect to the two substrates.

23. The strip as claimed in claim 20, wherein the strip is formed from at least one damping material and from a nondamping adhesive material, the adhesive material configured to bond the two substrates together.

24. The strip as claimed in claim 23, wherein the adhesive material adheres by two opposed faces to the two substrates respectively, the damping material being bonded to at least one of the two substrates.

25. The strip as claimed in claim 23, wherein the adhesive material adheres by one of its faces to the damping material that is bonded to one of the two substrates and adheres by its opposite face to the other of the two substrates to be joined together.

26. The strip as claimed in claim 21, wherein the strip comprises plural damping materials placed as a stack of layers one on top of another, each of the materials at ends of the stack being bonded to one of the two substrates to be joined together or to the adhesive material.

27. The strip as claimed in claim 21, wherein the strip comprises plural damping materials placed in juxtaposition one beside another, each of the materials having two opposed surfaces bonded to the two substrates to be joined together, respectively.

28. The strip as claimed in claim 26, wherein the strip comprises plural damping materials placed as a stack and in juxtaposition, at least one or two materials partly constituting the stack being bonded to the two substrates to be joined together.

29. The strip as claimed in claim 23, wherein the adhesive material is placed to be stacked with the at least one damping material, is placed in juxtaposition with the at least one damping material, or is placed to be stacked with and in juxtaposition with the at least one damping material.

30. The strip as claimed in claim 23, wherein the at least one damping material comprises at least two damping materials, and wherein the at least two damping materials are separated by an air space.

31. The strip as claimed in claim 23, wherein the non-damping adhesive material is a polyurethane mastic having a Young's modulus E' of 21 MPa and a loss factor tan δ of 0.2.

32. A strip to be inserted between two substrates to cause acoustic attenuation of noise propagating through at least one of the two substrates,
wherein the strip is formed from at least one plastic-based damping material,
wherein the strip has an equivalent real stiffness per unit length $K'_{eq}$ equal to at least 25 MPa and an equivalent loss factor $\tan \delta_{eq}$ equal to at least 0.25,
wherein the at least one damping material is a polyurethane prepolymer that has an NCO percentage content of between 0.5 and 2%, the material comprising:
at least one polyetherpolyol with a functionality of two, having an index iOH of between 25 and 35, a glass transition temperature $T_g$ below −50° C., and a molecular mass between 3500 and 4500;
at least one polyetherpolyol with a functionality of between 2.3 and 4, having an index iOH between 25 and 800, and a glass transition temperature $T_g$ below −50° C.;
at least one polyesterpolyol with a functionality of two, having an index iOH between 20 and 40 and a glass transition temperature $T_g$ between −40 and −20° C.;
at least one polyesterpolyol with a functionality of two, having an index iOH between 30 and 90, a glass transition temperature $T_g$ between 0 and 30° C., and a softening point between 50 and 70° C.;
at least one isocyanate with a functionality of between 2.1 and 2.7 of the MDI type and an NCO percentage content between 11 and 33%;
at least one catalyst; and
optionally, at least one filler.

33. The strip as claimed in claim 32, wherein the strip is formed from plural damping materials.

34. The strip as claimed in claim 33, wherein the damping materials exhibit adhesion properties with respect to the two substrates.

35. The strip as claimed in claim 32, wherein the strip is formed from at least one damping material and from a nondamping adhesive material, the adhesive material configured to bond the two substrates together.

36. The strip as claimed in claim 35, wherein the adhesive material adheres by two opposed faces to the two substrates respectively, the damping material being bonded to at least one of the two substrates.

37. The strip as claimed in claim 35, wherein the adhesive material adheres by one of its faces to the damping material that is bonded to one of the two substrates and adheres by its opposite face to the other of the two substrates to be joined together.

38. The strip as claimed in claim 32, wherein the strip comprises plural damping materials placed as a stack of layers one on top of another, each of the materials at ends of the stack being bonded to one of the two substrates to be joined together or to the adhesive material.

39. The strip as claimed in claim 32, wherein the strip comprises plural damping materials placed in juxtaposition one beside another, each of the materials having two opposed surfaces bonded to the two substrates to be joined together, respectively.

40. The strip as claimed in claim 38, wherein the strip comprises plural damping materials placed as a stack and in juxtaposition, at least one or two materials partly constituting the stack being bonded to the two substrates to be joined together.

41. The strip as claimed in claim 35, wherein the adhesive material is placed to be stacked with the at least one damping material, is placed in juxtaposition with the at least one damping material, or is placed to be stacked with and in juxtaposition with the at least one damping material.

42. The strip as claimed in claim 35, wherein the at least one damping material comprises at least two damping materials, and wherein the at least two damping materials are separated by an air space.

43. The strip as claimed in claim 35, wherein the non-damping adhesive material is a polyurethane mastic having a Young's modulus E' of 21 MPa and a loss factor tan δ of 0.2.

44. The strip formed as a stack of the at least one damping material as claimed in claim 20 and of a nondamping adhesive polyurethane mastic material, wherein the strip has, at 20° C., with a cross section of 15 mm in width and 3 mm in thickness for each of the two materials, an equivalent real stiffness per unit length of 70 MPa and an equivalent loss factor of 0.95.

45. The strip as claimed in claim 32, wherein the strip comprises, the NCO % content being between 1.8 and 2.2%:
between 180 and 220 g of a polyetherpolyol with a functionality of two, having an index iOH between 25 and 35, a glass transition temperature $T_g$ below −50° C., and a molecular mass between 3500 and 4500;
between 75 and 115 g of an isocyanate of the MDI type having an NCO % content equal to 11.9%;
between 5 and 30 g of carbon black;
between 0.5 and 3 g of catalyst;
between 10 and 30 g of pyrogenic silica;
between 135 and 180 g of a liquid and amorphous polyesterpolyol A with an index iOH between 27 and 34, a molecular mass of 3500, a functionality of two, and a glass transition temperature $T_g$ of −30° C.;
between 35 and 85 g of a liquid and amorphous polyesterpolyol B with an index iOH between 27 and 34, a molecular mass of 3500, a functionality of two, and a glass transition temperature $T_g$ of +20° C., respectively;
between 55 and 110 g of an MDI-type isocyanate, with an NCO % content of 11.9%; and
between 20 and 80 g of molecular sieve.

46. The strip formed from the single damping material as claimed in claim 32, wherein the strip has, at 20° C., with a reference cross section of 15 mm in width and 3 mm in thickness, an equivalent real stiffness per unit length of 120 MPa and an equivalent loss factor of 0.75.

47. The strip as claimed in claim 46, wherein the strip is inserted between a glass substrate and a metal element so as to be used for attaching the substrate to the metal element.

* * * * *

UNITED STATES PATENT AND TRADEMARK OFFICE
CERTIFICATE OF CORRECTION

| | |
|---|---|
| PATENT NO. | : 7,344,772 B2 |
| APPLICATION NO. | : 10/521786 |
| DATED | : March 18, 2008 |
| INVENTOR(S) | : Rehfeld et al. |

It is certified that error appears in the above-identified patent and that said Letters Patent is hereby corrected as shown below:

On the title page, Item (75), the Inventors' information is incorrect. Item (75) should read:
-- (75)   Inventors:   Marc Rehfeld, Ezanville (FR); Beatrice Mottelet, Compiegne (FR); Dimitri Leroy, Liege (BE); Frederic Drujon, Machemont (FR)

Signed and Sealed this

Eighth Day of December, 2009

David J. Kappos
*Director of the United States Patent and Trademark Office*